US009909888B2

(12) United States Patent
Akiyama et al.

(10) Patent No.: US 9,909,888 B2
(45) Date of Patent: Mar. 6, 2018

(54) NOTIFYING A MOBILE BODY THAT THE MOBILE BODY IS APPROACHING PARTICULAR AREA

(71) Applicant: International Business Machines Corporation, Armonk, NY (US)

(72) Inventors: Kazuhito Akiyama, Tokyo (JP); Eisuke Kanzaki, Kanagawa-ken (JP); Hiroya Ogihara, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/931,948

(22) Filed: Nov. 4, 2015

(65) Prior Publication Data
US 2016/0138930 A1 May 19, 2016

(30) Foreign Application Priority Data

Nov. 14, 2014 (JP) .................................. 2014-231662

(51) Int. Cl.
*G01C 21/34* (2006.01)
*H04W 4/04* (2009.01)

(52) U.S. Cl.
CPC ........ *G01C 21/3461* (2013.01); *G01C 21/343* (2013.01); *G01C 21/3415* (2013.01); *G01C 21/3492* (2013.01); *H04W 4/046* (2013.01)

(58) Field of Classification Search
CPC .. G01C 21/34; G01C 21/3415; G01C 21/343; G01C 21/3461; G01C 21/3492; H04W 4/046

(Continued)

(56) References Cited

U.S. PATENT DOCUMENTS 6,151,552 A * 11/2000 Koizumi ............ G01C 21/3629
340/988
6,317,686 B1 * 11/2001 Ran .................... G01C 21/3691
701/117

(Continued)

FOREIGN PATENT DOCUMENTS

JP          06111193 A      4/1994
JP      2000346664 A     12/2000

(Continued)

OTHER PUBLICATIONS

Akiyama et al., "Method of Notifying Mobile Body That the Mobile Body Is Approaching Particular Area, and Server Computer and Server Computer Program for the Method", Japan Application No. 2014-231662 (English translation), filed on Nov. 14, 2014, pp. 1-104.

*Primary Examiner* — Fadey Jabr
*Assistant Examiner* — Angelina Shudy
(74) *Attorney, Agent, or Firm* — Jared C. Chaney

(57) ABSTRACT

A method for notifying a mobile body that the mobile body is approaching a particular area comprising calculating a plurality of areas where the mobile body may arrive on the basis of dynamic map information; calculating, for each event occurring in the plurality of areas, an arriving probability of arriving at a region affected by the event; extracting an avoidance position for enabling the mobile body to avoid arriving at the region affected by the event; calculating an encountering probability of meeting the region affected by the event on the basis of a reliability of the event, the arriving probability, and the avoidance position, and notifying the mobile body of the encountering probability.

17 Claims, 19 Drawing Sheets

(58) Field of Classification Search
USPC .................................................. 701/465, 516
See application file for complete search history.

(56) References Cited

U.S. PATENT DOCUMENTS

| | | | | |
|---|---|---|---|---|
| 8,762,049 | B2* | 6/2014 | Feng | G01C 21/343 |
| | | | | 701/1 |
| 8,996,228 | B1* | 3/2015 | Ferguson | G01C 21/3461 |
| | | | | 348/118 |
| 9,091,561 | B1* | 7/2015 | Weir | G01C 21/3484 |
| 9,277,365 | B1 | 3/2016 | Wilden et al. | |
| 9,467,839 | B1* | 10/2016 | Nishimura | H04W 4/02 |
| 2004/0143387 | A1* | 7/2004 | Shimizu | G01C 21/3415 |
| | | | | 701/414 |
| 2005/0096839 | A1* | 5/2005 | Nakano | G08G 1/0969 |
| | | | | 701/532 |
| 2006/0173841 | A1* | 8/2006 | Bill | G01C 21/3407 |
| 2006/0224302 | A1* | 10/2006 | Kwok | G01C 21/3415 |
| | | | | 701/416 |
| 2007/0222639 | A1* | 9/2007 | Giles | G08G 1/07 |
| | | | | 340/907 |
| 2008/0084287 | A1* | 4/2008 | Sturm | B60W 50/14 |
| | | | | 340/438 |
| 2008/0215236 | A1* | 9/2008 | Deurwaarder | G01C 21/34 |
| | | | | 701/412 |
| 2010/0004854 | A1* | 1/2010 | Shin | G01C 21/3415 |
| | | | | 701/533 |
| 2011/0130947 | A1* | 6/2011 | Basir | G08G 1/0104 |
| | | | | 701/119 |
| 2011/0288757 | A1* | 11/2011 | Ignatin | G08G 1/096741 |
| | | | | 701/119 |
| 2012/0148094 | A1* | 6/2012 | Huang | G06K 9/00785 |
| | | | | 382/103 |
| 2013/0054136 | A1* | 2/2013 | Tomita | G01C 21/3655 |
| | | | | 701/428 |
| 2013/0173150 | A1* | 7/2013 | Ghisio | G01C 21/26 |
| | | | | 701/423 |
| 2013/0304347 | A1* | 11/2013 | Davidson | G06Q 10/083 |
| | | | | 701/99 |
| 2013/0304349 | A1* | 11/2013 | Davidson | G08G 1/0112 |
| | | | | 701/99 |
| 2014/0025281 | A1* | 1/2014 | Zhao | G01C 21/3492 |
| | | | | 701/118 |
| 2014/0031059 | A1* | 1/2014 | Rhoads | G08G 1/08 |
| | | | | 455/456.1 |
| 2014/0058671 | A1* | 2/2014 | Ichikawa | G01C 21/3694 |
| | | | | 701/533 |
| 2014/0141808 | A1 | 5/2014 | Deng | |
| 2014/0180566 | A1 | 6/2014 | Malhotra | |
| 2014/0278031 | A1* | 9/2014 | Scofield | G08G 1/00 |
| | | | | 701/118 |
| 2014/0278032 | A1* | 9/2014 | Scofield | G01C 21/3492 |
| | | | | 701/118 |
| 2014/0279723 | A1 | 9/2014 | McGavran et al. | |
| 2015/0248795 | A1* | 9/2015 | Davidson | G01C 21/34 |
| | | | | 701/1 |
| 2015/0253144 | A1* | 9/2015 | Rau | G01C 21/3415 |
| | | | | 705/348 |
| 2015/0292896 | A1* | 10/2015 | Park | G01C 21/3415 |
| | | | | 701/532 |
| 2015/0354978 | A1 | 12/2015 | Gerlach | |
| 2016/0078758 | A1* | 3/2016 | Basalamah | G08G 1/0112 |
| | | | | 701/118 |
| 2016/0092317 | A1* | 3/2016 | Akiyama | H04L 1/0084 |
| | | | | 714/20 |
| 2016/0123747 | A1* | 5/2016 | Takeuchi | G01C 21/3461 |
| | | | | 701/417 |
| 2016/0133130 | A1* | 5/2016 | Grimm | G08G 1/096766 |
| | | | | 340/905 |
| 2016/0282132 | A1* | 9/2016 | Bostick | G01C 21/3415 |
| 2016/0321924 | A1* | 11/2016 | Lewis | G08G 1/096791 |
| 2017/0012812 | A1* | 1/2017 | Gotoh | H04W 4/027 |
| 2017/0160096 | A1* | 6/2017 | Davidson | G01C 21/3617 |
| 2017/0201449 | A1* | 7/2017 | Akiyama | H04L 43/10 |
| 2017/0272927 | A1* | 9/2017 | Nishimura | H04W 4/04 |

FOREIGN PATENT DOCUMENTS

| | | |
|---|---|---|
| JP | 2001067594 A | 3/2001 |
| JP | 2001305953 A | 11/2001 |
| JP | 2002156236 A | 5/2002 |
| JP | 2002168940 A | 6/2002 |
| JP | 2002206930 A | 7/2002 |
| JP | 2004234320 A | 8/2004 |
| JP | 2005071383 A | 3/2005 |
| JP | 2005134427 A | 5/2005 |
| JP | 2005134429 A | 5/2005 |
| JP | 2005181178 A | 7/2005 |
| JP | 2006127094 A | 5/2006 |
| JP | 2006127095 A | 5/2006 |
| JP | 2007233645 A | 9/2007 |
| JP | 2009157735 A | 7/2009 |
| JP | 2009541833 A | 11/2009 |
| JP | 2010210487 A | 9/2010 |

* cited by examiner

NOTIFYING A MOBILE BODY THAT THE MOBILE BODY IS APPROACHING PARTICULAR AREA

BACKGROUND OF THE INVENTION

The present invention relates to navigation. Particularly, the present invention relates to a technique of notifying a mobile body that the mobile body is approaching a particular area.

A car navigation system displays, on a screen thereof, a road map around a vehicle in which the system is installed, and also displays various kinds of road traffic information, such as an occurrence of traffic jam, on the road map for notifying a driver. As navigation systems become smaller, a mobile navigation system (also referred to as a portable navigation system) is now used not only in a vehicle but also by a pedestrian. Furthermore, in recent years, a navigation application installed on a smartphone and a tablet terminal provides a navigation function by utilizing a GPS function. As described above, vehicles and pedestrians are increasingly using a navigation function for moving to a destination.

SUMMARY

As disclosed herein, a method of notifying a mobile body having a communication function that the mobile body is approaching a particular area includes the steps, executed by a computer, of calculating a plurality of areas where a mobile body may arrive on a basis of dynamic map information, calculating, an arriving probability of arriving at a region affected by an event, extracting an avoidance position for enabling the mobile body to avoid arriving at the region affected by the event, calculating an encountering probability of meeting the region affected by the event on the basis of a reliability of the event, the arriving probability, and the avoidance position, and notifying the mobile body of the encountering probability. A computer program product and computer system corresponding to the method are also disclosed.

DETAILED DESCRIPTION

Figure 1A:
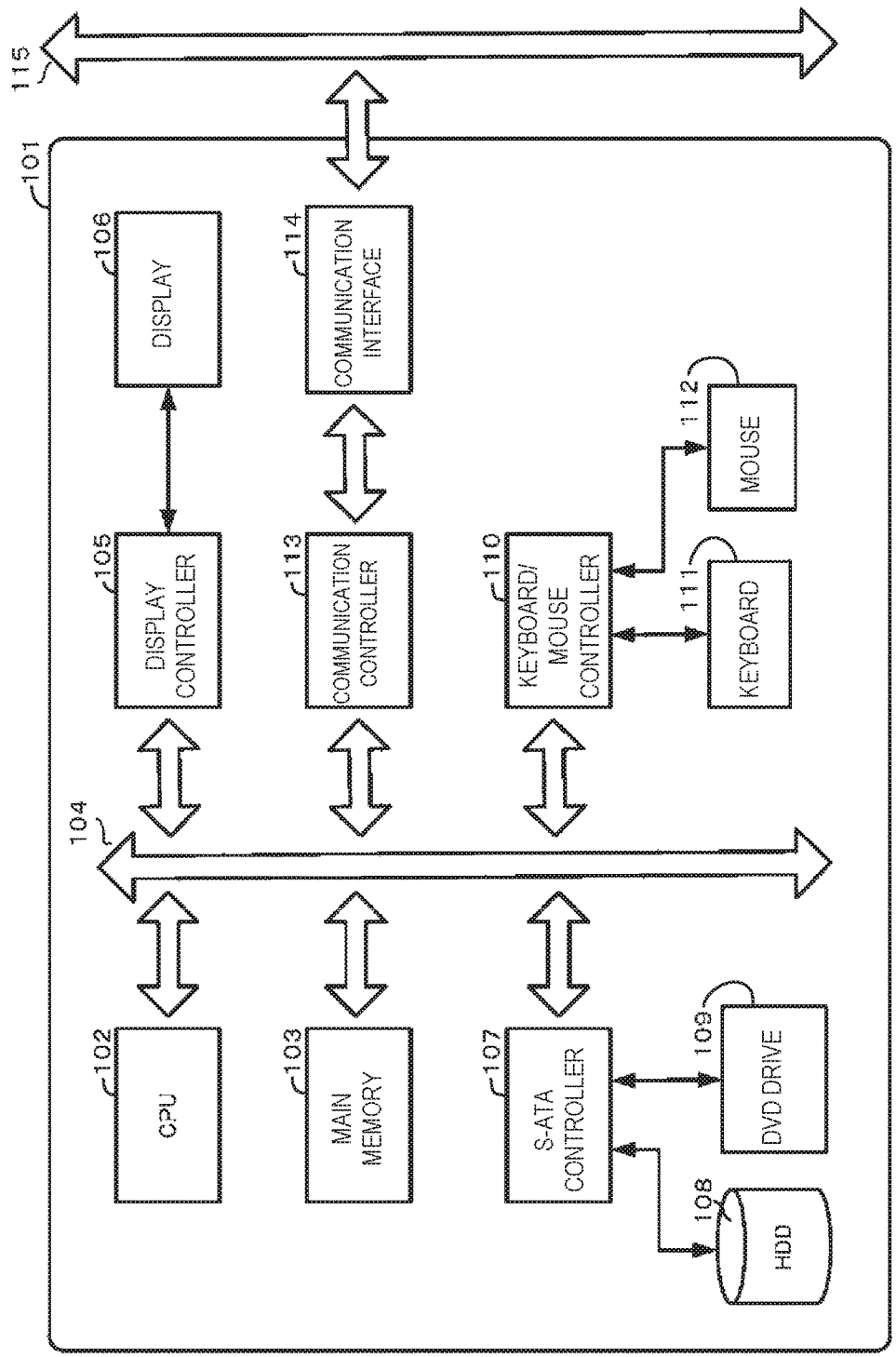
FIG. 1A is a diagram illustrating one example of a server computer that may be used in an embodiment of the present invention or a server computer according to an embodiment of the present invention.

Event information about road conditions, such as traffic jams and traffic accidents, is obtained from an information source such as a road traffic center. In the era of big data in recent years, however, event information (such as control information, positional information, moving conditions, temperatures, images, and movies) from an onboard computer (such as an ECU (Electronic Control Unit)), an onboard device installed in a vehicle (such as a car navigation system), a sensor/device provided in a building on or adjacent to a road (such as an land bridge, a traffic light, or a tollgate of an expressway), and a sensor/device in an electronic device terminal (such as a smartphone and a tablet terminal) possessed by a person, for example, can be the information source.

It is thus an object of the present invention to provide a technique for notifying a mobile body that the mobile body is approaching a particular area on the basis of various kinds of event information.

The present invention provides a technique for notifying a mobile body that the mobile body is approaching a particular area. The technique includes a method of notifying the mobile body that the mobile body is approaching a particular area, and a server computer, a program for a server computer, and a program product for a server computer for notifying the mobile body that the mobile body is approaching a particular area.

Embodiments of the present invention will now be described with reference to the accompanying drawings. In the drawings, like numerals depict like members or components, if not otherwise specified. It should be noted that embodiments of the present invention are provided not for limiting the scope of the present invention as described below but for describing preferred aspects of the present invention.

In one embodiment of the present invention, the server computer may further execute the steps of: collecting events; and incrementing the reliability of an event when the same event is collected.

According to one embodiment of the present invention, the step of calculating a plurality of areas may further include a step of creating an event notification range for notifying the mobile body of the event. The event notification range may change in accordance with the reliability of the event.

According to one embodiment of the present invention, the step of calculating a plurality of areas may further include a step of connecting reachable points of the mobile body to create a mobile body notification range of the mobile body.

According to one embodiment of the present invention, the step of calculating a plurality of areas may include a step of determining the closeness between the event notification range and the mobile body notification range for calculating a plurality of areas where the mobile body may arrive.

According to one embodiment of the present invention, the step of calculating the encountering probability may further execute a step of recalculating the encountering probability in accordance with dynamic change of an overlapping region between the event notification range and the mobile body notification range.

According to one embodiment of the present invention, the step of calculating the encountering probability may further execute a step of: calculating the encountering probability for each traveling direction of the mobile body; calculating the encountering probability for each traveling lane of the mobile body; calculating the encountering probability for each moving route of the mobile body; or calculating the encountering probability on the basis of a driving history of the mobile body or another mobile body.

According to one embodiment of the present invention, the step of calculating the arriving probability may further include a step of calculating an estimated arrival time of the mobile body to arrive at the region affected by the event. The arriving probability may be calculated on the basis of the estimated arrival time.

According to one embodiment of the present invention, the server computer may calculate the encountering probability on the basis of the estimated arrival time in addition to the reliability of the event, the arriving probability, and the avoidance position.

According to one embodiment of the present invention, the step of notifying the mobile body of the encountering probability may include a step of further notifying the mobile body of a type of the event corresponding to the encountering probability in addition to the encountering probability.

According to one embodiment of the present invention, the step of notifying the mobile body of the encountering probability may include a step of further notifying the mobile body of a location of the event corresponding to the encountering probability in addition to the encountering probability.

A server computer for notifying a mobile body having a communication function that the mobile body is approaching a particular area includes: area calculation means for calculating a plurality of areas where the mobile body may arrive on the basis of dynamic map information; arriving probability calculation means for calculating, for each event occurring in the plurality of areas, an arriving probability of arriving at a region affected by the event; avoidance position extraction means for extracting an avoidance position for enabling the mobile body to avoid arriving at the region affected by the event; encountering probability calculation means for calculating an encountering probability of meeting the region affected by the event on the basis of a reliability of the event, the arriving probability, and the avoidance position; and notification means for notifying the mobile body of the encountering probability.

According to one embodiment of the present invention, the server computer may further include event collection means for collecting events; and event reliability calculation means for incrementing the reliability of an event when the same event is collected.

According to one embodiment of the present invention, the area calculation means may create an event notification range for notifying the mobile body of the event. The event notification range may change in accordance with the reliability of the event.

According to one embodiment of the present invention, the area calculation means may connect reachable points of the mobile body to create a mobile body notification range of the mobile body.

According to one embodiment of the present invention, the area calculation means may determine the closeness between the event notification range and the mobile body notification range for calculating a plurality of areas where the mobile body may arrive.

According to one embodiment of the present invention, the encountering probability calculation means may recalculate the encountering probability in accordance with dynamic change of an overlapping region between the event notification range and the mobile body notification range.

According to one embodiment of the present invention, the encountering probability calculation means may further calculate: the encountering probability for each traveling direction of the mobile body; the encountering probability for each traveling lane of the mobile body; the encountering probability for each moving route of the mobile body; or the encountering probability on the basis of a driving history of the mobile body or another mobile body.

According to one embodiment of the present invention, the server computer may further include estimated arrival time calculation means for calculating an estimated arrival time of the mobile body to arrive at the region affected by the event. The estimated arrival time calculation means may calculate the encountering probability on the basis of the estimated arrival time.

According to one embodiment of the present invention, the encountering probability calculation means may calculate the encountering probability on the basis of the estimated arrival time in addition to the reliability of the event, the arriving probability, and the avoidance position.

According to one embodiment of the present invention, the notification means may further notify the mobile body of a type of the event corresponding to the encountering probability in addition to the encountering probability.

According to one embodiment of the present invention, the notification means may further notify the mobile body of a location of the event corresponding to the encountering probability in addition to the encountering probability.

According to a third aspect of the present invention, a server computer program or server computer program product for notifying a mobile body having a communication function that the mobile body is approaching a particular area makes a server computer execute each step of the first aspect of the present invention.

The server computer program according to an embodiment of the present invention can be stored in any computer-readable storage medium such as one or more flexible disks, MOs, CD-ROMs, DVDs, BDs, hard disk devices, memory media connectable to an USB, ROMs, MRAMs, and RAMs. In order to store the server computer program in the storage medium, the server computer program may be downloaded from another computer, such as another server computer, connected via a communication line or may be copied from another storage medium. Also, the server computer program according to an embodiment of the present invention may be compressed or divided into a plurality of pieces for storing in one or more storage media. Also, it should be noted that the server computer program product according to an embodiment of the present invention can of course be provided in various forms. The server computer program product according to an embodiment of the present invention may include, for example, a storage medium in which the server computer program is stored and a communication medium through which the server computer program is transmitted.

It should be noted that the above described summary of the present invention does not list all of the necessary features of the present invention, and that a combination or sub-combination of these components may also constitute the present invention.

A person ordinarily skilled in the art to which the present invention pertains can of course easily find various modifications of the present invention, such as combining various hardware components of computers used in embodiments of the present invention with a plurality of machines, distributing functions to the machines, and executing the functions in the machines. Those modifications are concepts naturally included in the idea of the present invention. These components, however, are merely examples and not all of the components are essential components of the present invention.

Also, the present invention can be achieved as software, hardware, or a combination of software and hardware. A typical example of achieving the present invention as a combination of software and hardware is to execute the server computer program in a server computer in which the server computer program is installed. In such case, by being loaded into a memory of the server computer and executed, the server computer program controls the server computer and makes the server computer execute processes of the present invention. The server computer program may consist of a set of instructions that can be represented with any language, code, or notation. Such set of instructions enables the server computer to directly execute a particular function, or to execute processes according to an embodiment of the present invention after being converted to another language, code, or notation and/or being copied to another medium.

FIG. 1A is a diagram illustrating one example of a server computer that may be used in an embodiment of the present invention or a server computer according to an embodiment of the present invention. The server computer may be, but not limited to, one or more computers, such as server computers (e.g., computers having a server function).

A server computer (101) includes one or more CPUs (102) and a main memory (103) that are connected to a bus (104). The CPU (102) is based on a 32-bit or 64-bit architecture, for example.

A display (106), such as a liquid crystal display (LCD), may be connected to the bus (104) via a display controller (105). Also, the liquid crystal display (LCD) may be a touch panel display or a floating touch display, for example. The display (106) may be used for displaying objects displayed by the operation of software running on the server computer (101) (such as a server computer program according to an embodiment of the present invention) or any of various server computer programs running on the server computer (101) in an appropriate graphic interface. The display (106) may also output a screen of a web browser application, for example.

Optionally, a disk (108) such as a hard disk or a solid state drive (SSD) may be connected to the bus (104) via a SATA or IDE controller (107), for example.

Optionally, a drive (109) such as a CD drive, a DVD drive, or a BD drive may be connected to the bus (104) via the SATA or IDE controller (107), for example.

Optionally, a keyboard (111) and a mouse (112) may be connected to the bus (104) via a peripheral device controller (110) such as a keyboard/mouse controller or a USB bus.

An operating system, programs, and data are stored in the disk (108) so as to be loadable to the main memory (103). The programs include one that provides a Java® processing environment such as J2EE, a Java® application, a Java® virtual machine (VM), or a Java® just-in-time (JIT) compiler, the server computer program according to an embodiment of the present invention, and any of other various server computer programs.

Also, software for enabling stream processing may be stored in the disk (108) so as to be loadable to the main memory (103).

The disk (108) may be either provided in the server computer (101), connected to the server computer (101) via a cable so as to be accessible from the server computer (101), or connected to the server computer (101) via a wired or wireless network so as to be accessible from the server computer (101).

The drive (109) may be used, as needed, for installing a program, such as an operating system, an application program, or the server computer program according to an embodiment of the present invention, from a CD-ROM, DVD-ROM, or BD into the disk (108).

A communication interface (114) complies with Ethernet® protocol, for example. The communication interface (114) is connected to the bus (104) via a communication controller (113), plays a role of wiredly or wirelessly connecting the server computer (101) to a communication line (115), and provides a network interface layer to a TCP/IP communication protocol of a communication function of an operating system of the server computer (101). The communication line may be a wireless LAN environment based on a wireless LAN connection standard, a Wi-Fi wireless LAN environment such as IEEE 802.11a/b/g/n, or a cellular network environment (such as a 3G, LTE, or 4G environment), for example.

Figure 1B:
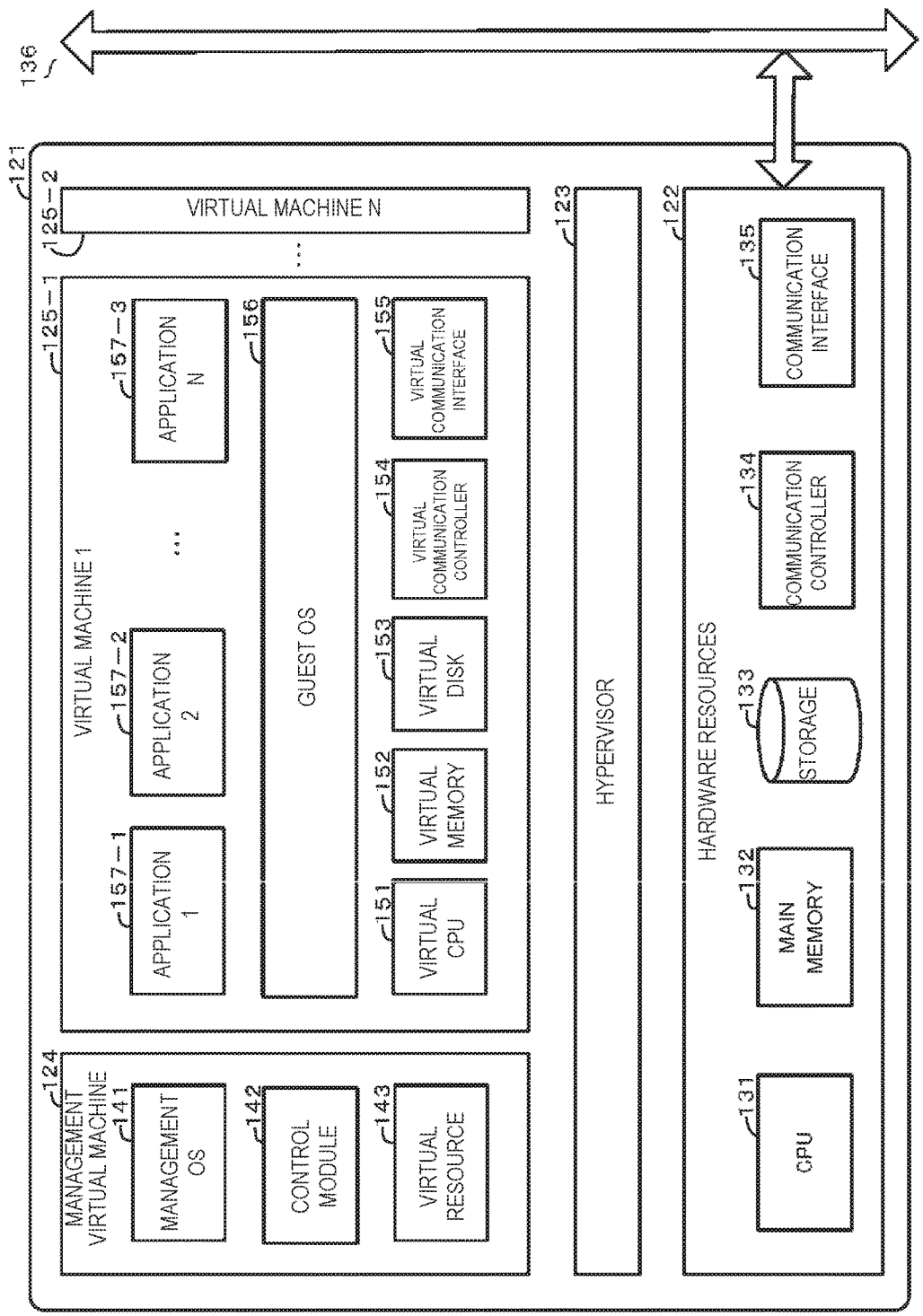
FIG. 1B is a diagram illustrating one example of a server computer that may be used in an embodiment of the present invention or a server computer according to an embodiment of the present invention, wherein one or more virtual machines operate on the server computer.

FIG. 1B is a diagram illustrating one example of a server computer that may be used in an embodiment of the present invention or a server computer according to an embodiment of the present invention, wherein one or more virtual machines operate on the server computer. The server computer may be configured as a computer apparatus such as a workstation, a rack-mount type server, a blade type server, a mid-range computer, and a mainframe, for example.

A server computer (121) illustrated in FIG. 1B may include one or more CPUs (131), a main memory (132), a storage (133), a communication controller (134), and a communication interface (135) as hardware resources (122). The one or more CPUs (131), the main memory (132), the storage (133), the communication controller (134), the communication interface (135), and a communication line (136) may respectively correspond to the one or more CPUs (102), the main memory (103), the disk (108), the communication controller (113), the communication interface (114), and the communication line (115) of the server computer (101) illustrated in FIG. 1A.

Also, the server computer (121) operates as a physical host machine, and is capable of operating one or more virtual machines 1 to n (125-1 to 125-2) (also referred to as domain U or child partition) that use the same or different OSs as a guest OS (156) on a hypervisor (also referred to as virtual monitor or virtual OS) of virtualization software.

Also, the server computer (121) is capable of operating a management virtual machine (124) (also referred to as domain 0 or parent partition) on the hypervisor. The management virtual machine (124) includes a management OS (141), a control module (142) operating on the management OS (141), and a virtual resource (143). The control module (142) is a module that issues a command to the hypervisor (123). Also, the control module (142) issues a command to the hypervisor (123) for creating the virtual machines 1 to n (125-1 to 125-2) in a user domain and for invoking the guest OS (156), and controls the operation of the virtual machine 1 to n (125-1 to 125-2). The virtual resource (143) is one of the hardware resources (122) allocated for the management virtual machine (124).

The virtual machines 1 to n (125-1 to 125-2) include virtual resources, the guest OS (156), and various applications 1 to n (157-1 to 157-3) operating on the guest OS (156). The virtual resources include, for example, a virtual CPU (151), a virtual memory (152), a virtual disk (153), a virtual communication controller (154), and a virtual communication interface (155).

FIGS. 2A to 2D described below are flow charts for a process in which a server computer notifies a mobile body that the mobile body is approaching a particular area in accordance with an embodiment of the present invention.

Definitions of terms needed for understanding the flow charts will now be described.

In embodiments of the present invention, the term "mobile body" refers to a tangible object that has own movement means or that does not have own movement means but is movable along with another movable object having movement means. The mobile body having its own movement means may be, but not limited to, a vehicle, an electric train, a railway train, or an airplane. The mobile body not having its own movement means but movable along with another movable object having movement means may be, but not limited to, an onboard device (such as a car navigation system) or an electronic device (such as a smartphone, a tablet terminal, a cellular phone, a personal computer, or a mobile navigation system). The another movable object having movement means may be, for example, a person, a vehicle, an electric train, a railway train, or an airplane.

The mobile body can directly or indirectly communicate with a server computer in accordance with an embodiment of the present invention via, for example, a wireless network, a cellular network, or a satellite network.

The term "event" in embodiments of the present invention means, for example, one of various events defined in the ITS (Intelligent Transportation System). Also, the "event" may include, for example, a combination of information pieces (such as correlation between the information pieces) from a plurality of information sources (such as devices or sensors) that is identified as an event. The "event" may also include a new event generated from a correlation between a plurality of events when the plurality of events exist in a same place. Typically, the "event" may be obtained from, but not limited to: sensor information (such as moving speed control information (such as information about an accelerator, a brake, or engine speed)), image or movie information from the mobile body; various kinds of sensor information, weather information, disaster information (such as a fire, a cave-in of a road, or other natural disasters such as a flood, a tsunami, a typhoon, or a tornado), traffic control information or traffic regulation information (such as a speed limit, a vehicle height limit, a vehicle weight limit, a route restriction, or a lane (e.g., a right-turn, straight, or left-turn lane) restriction on an ordinary road, a highway, or a road on a bridge), traffic jam information, construction information, traffic accident information, road surface information, parking information, school zone information, school commuting hours information, images, or movies from sensors; or special occasion information (such as information about a concert, a festival, or a sport event (such as a baseball, soccer, or fighting sport match)).

In embodiments of the present invention, "reliability of an event" means a reliability that the event actually exists, or a reliability of information about the event. A reliability of an event may be calculated on the basis of an information source of the event, frequency of reporting the same event, or a combination of the information source and the frequency. An information source of an event may be, for example, a public or private institution such as a traffic information center (i.e., an institution whose main business is to provide information), the mobile body, or a plurality of sensors (e.g., sensors provided on a mobile body, a road, a land bridge, or a building on or adjacent to a road). The reporting of the same event may be done by a plurality of mobile bodies or a plurality of sensors (e.g., sensors provided on a mobile body, a road, a land bridge, or a building on or adjacent to a road), for example.

A reliability of an event may be set so as to be calculated higher when the information source of the event is a public or private institution, such as a traffic information center, than when the information source of the event is the mobile body. For example, a reliability of an event may be weighted according to the information source of the event while being calculated. For example, if the information source of the event is a public or private institution, which is highly reliable, then the information from that information source is probably accurate (i.e., highly reliable) and thus may be highly weighted. On the other hand, if the information source of the event is the mobile body, then the information from that information source is doubtful (i.e., less reliable) and thus may be less weighted.

Also, the reliability of an event from a more reliable information source may be set higher than the reliability of an event from a less reliable information source (such as a mobile body), for example.

Also, the reliability of an event may be set so as to be calculated higher as the frequency of reporting the same event increases. For example, as the same event is reported from different mobile bodies, or as the same event is repeatedly reported from the same mobile body at predetermined intervals, for example, the reliability of the event may be changed to be higher.

"Dynamic map information", or dynamic map, includes so-called static map information and map information in which information that changes moment to moment or in real time (such as traffic control or traffic regulation information, traffic jam information, construction information, traffic accident information, road surface information, or parking information) is associated with polygons on a map.

Dynamic map information may include nodes (such as intersections) and lines (also referred to as edges) (such as roads) connecting the nodes. For example, a road consists of a line (edge) connecting an intersection (node) and a node.

In the following description, it should be noted that the server computer (121) may represent not only the server computer (121) illustrated in FIG. 1B but also the server computer (101) illustrated in FIG. 1A.

Figure 2A:
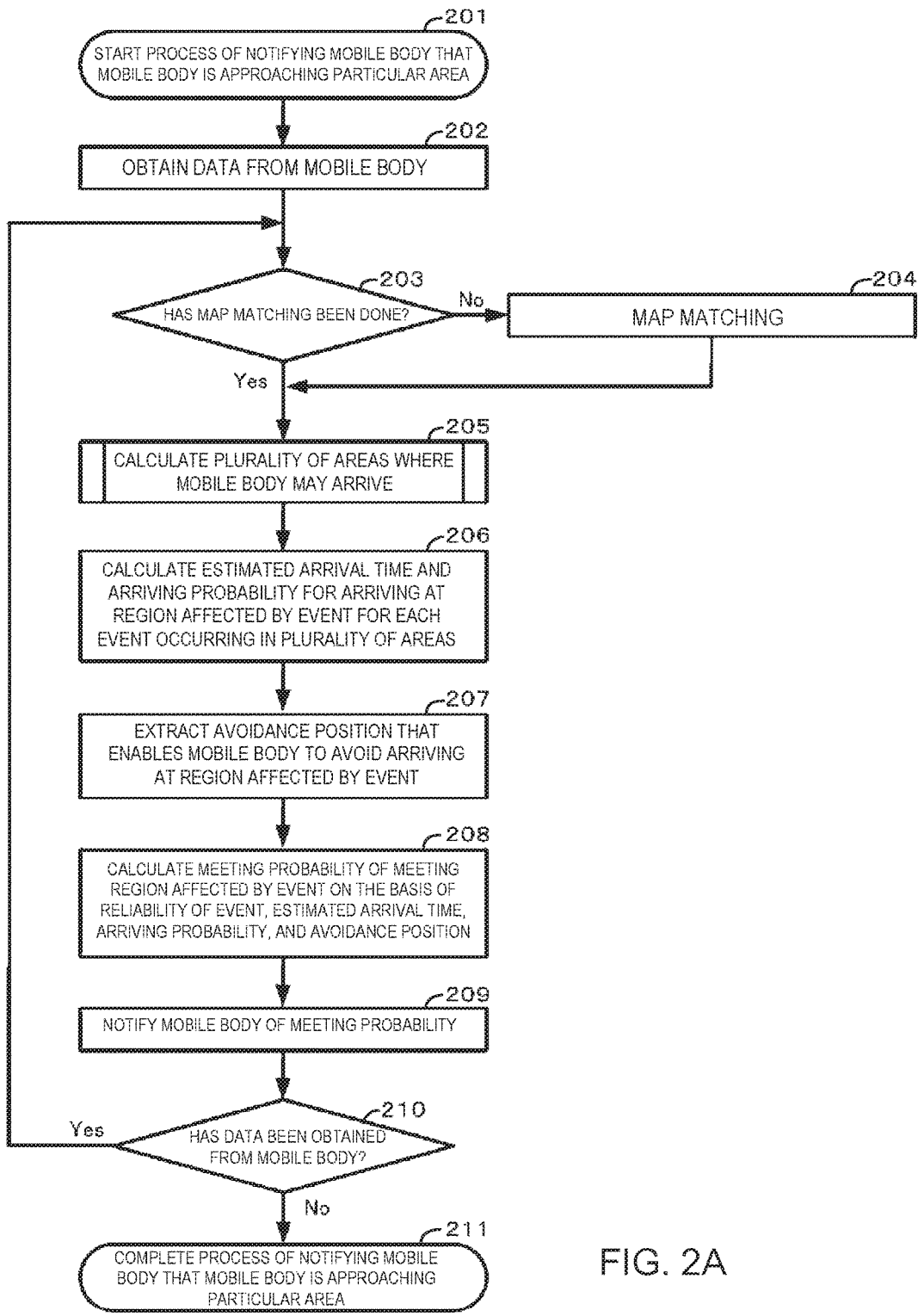
FIG. 2A is a flow chart for a process in which a server computer notifies a mobile body that the mobile body is approaching a particular area in accordance with an embodiment of the present invention.

FIG. 2A is a flow chart of a whole process in which a server computer notifies a mobile body that the mobile body is approaching a particular area in accordance with an embodiment of the present invention.

In step 201, the server computer (121) starts the process of notifying a mobile body having a communication function that the mobile body is approaching a particular area.

In step 202, the server computer (121) obtains data (such as car probe data) from a mobile body (such as a vehicle). The car probe data is navigation information (such as car navigation data) that can be obtained from a mobile body having a communication function. The car probe data includes real-time probe and accumulation-type probe, for example. The accumulation probe may include, for example, traveling history data, auto-parking memory data, spot data, setting data, utilization data, fuel consumption management data, speech recognition data, and communication history data.

Also, in step 202, the server computer (121) may further obtain event information from an information source of an event.

In step 203, the server computer (121) determines whether map matching for a particular mobile body has been done. The map matching is a process of identifying a road (edge) on which a mobile body is traveling. The map matching may also be executed in a device (such as an onboard device of a vehicle) provided on a mobile body. When the map matching is executed on a mobile body, the car probe data may include information about roads (edges). If the map matching has not been done, the server computer (121) forwards the process to step 204. On the other hand, if the map matching has been done, the server computer (121) forwards the process to step 205.

In step 204, in response to the fact that the map matching has not been done, the server computer (121) executes the map matching for the particular mobile body.

In step 205, the server computer (121) calculates a plurality of areas where the mobile body may arrive on the basis of dynamic map information. An area may include a spot, a territory, and an area. The step of calculating the plurality of areas will be described later in detail with reference to the flow chart illustrated in FIG. 2B.

In step 206, the server computer (121) calculate, for each event (that may affect the mobile body) occurring in the plurality of areas where the mobile body may arrive calculated in step 205, an estimated arrival time and an arriving probability of arriving at a region affected by the event. The server computer (121) may calculate the estimated arrival time and the arriving probability on the basis of how an event notification range of each event and a mobile body notification range of the mobile body overlap one another, for example. The arriving probability is a probability of arriving at a point identified by the overlap between the event notification range and the mobile body notification range. A region affected by an event refers to a peripheral region of a spot where the event is occurring, or a peripheral region of a spot where the event is occurring and another spot affected by the spot where the event is occurring. A peripheral region affected by an event may be modified as needed on the basis of a type of the event. Also, a region affected by an event is represented with a polygon, for example, and may include a concave portion, a convex portion, or a curved portion.

The estimated arrival time may be calculated, for example, by using the dynamic map information on the basis of the following function:

Estimated arrival time=$f$(distance,speed of mobile body,flow volume on road,the number of intersections,history information).

The distance is a distance between a mobile body and a region affected by an event. This distance may be calculated, for example, by using GPS information from a mobile body, access point connection information for connecting to a network, or connection information for connecting to a base station for cellular phones.

The speed of a mobile body may be calculated, for example, by using information from a speed sensor of the mobile body. The flow volume on a road may be calculated by using the result of analyzing images from a traffic monitoring sensor or the mobile body. The number of intersections is the number of intersections that exist between the current position of the mobile body and a road on which the event is occurring, and may be calculated by using the dynamic map information. The history information may be travelling history information of the mobile body or travelling history information of mobile bodies that has traveled on the road (such as history information obtained by arithmetic processing such as averaging).

The arriving probability may be calculated, for example, by using the dynamic map information on the basis of the following function:

arriving probability=$f$(reliability of event,connection of roads,the number of branches of intersection, estimated arrival time,history information).

As described above, the reliability of an event may be calculated on the basis of an information source of the event, frequency of reporting the same event, or a combination of the information source and the frequency. The connection of a road is a connection of a road where the event is occurring, and is extracted by using the dynamic map information. The number of branches of an intersection is the number of roads where a mobile body can choose to travel on at the intersection, and is extracted by using the dynamic map information. The estimated arrival time is calculated by using the above-described function. The history information may be travelling history information of the mobile body or travelling history information of mobile bodies that has traveled on the road (such as history information obtained by arithmetic processing such as averaging).

In step 206, the server computer (121) may calculate the estimated arrival time and the arriving probability as follows. The server computer (121) calculates a point of the event notification range that extends most deeply into the mobile body notification range (hereinafter referred to as "point X") and a point of the mobile body notification range that extends most deeply into the event notification range (hereinafter referred to as "point Y"), calculates the estimated arrival time of the mobile body at the point X and the arriving probability for the event at the point Y, and adopts them as the estimated arrival time and the arriving probability of the mobile body for arriving at a region affected by the event.

In step 207, the server computer (121) extracts, on the basis of the dynamic map information, an avoidance position that enables the mobile body to avoid arriving at the region affected by the event. The server computer (121) may extract the avoidance position on the basis of how the event notification range of each event occurring in the plurality of areas at which the mobile body may arrive calculated at step 205 overlaps with the mobile body notification range of the mobile body, for example. The avoidance position may be a position at which the mobile body can turn right or left, make a lane change, make a U-turn, stop at a particular position, or enter into or stop at a side strip. The avoidance position may be counted as nodes at which the mobile body can avoid arriving at the region affected by an event. The technique itself for extracting the avoidance position may be anything known to a person ordinarily skilled in the art to which the present invention pertains.

In step 207, the server computer (121) may extract the avoidance position existing between the event and the point X calculated in step 206.

In step 208, the server computer (121) calculates, on the basis of the reliability of the event, the estimated arrival time and the arriving probability calculated in step 206, and the avoidance position extracted in step 207, an encountering probability of meeting the region affected by the event.

The encountering probability may be calculated, for example, by using the dynamic map information on the basis of the following formula:

encountering probability=$f$(reliability of event,arriving probability,avoidance position,history information).

The history information may be travelling history information of the mobile body or travelling history information of mobile bodies that has traveled on the road (such as history information obtained by arithmetic processing such as averaging).

In step 209, the server computer (121) notifies the mobile body of the encountering probability calculated in step 208. In addition to the encountering probability, the server computer (121) also notifies the mobile body of a mobile body notification range (also referred to as geo fencing or polygon) of the mobile body and the level of the encountering probability.

In step 210, the server computer (121) determines whether additional data (for example, data such as a current position of the mobile body from an onboard sensor) has been received from the mobile body. If the additional data has been received, the server computer (121) returns the process to step 203 and repeats steps 203 to 209. On the other hand, if the additional data has not received, for example, for a given period of time, the server computer (121) forwards the process to a final step 211.

In step 211, the server computer (121) completes the process of notifying the mobile body that the mobile body is approaching a particular area.

It should be noted that the processes illustrated in FIG. 2A as steps 205 to 208 (the step of calculating a plurality of areas, the step of calculating an arriving probability, the step of extracting an avoidance position, and the step of calculating an encountering probability) may be executed in parallel, and that each process use the processing result of another process. Also, the processes illustrated in FIG. 2A as steps 205 to 208 are repeatedly executed on the basis of an event, a reliability of the event, or a position of the mobile body, for example, that change moment to moment.

Figure 2B:
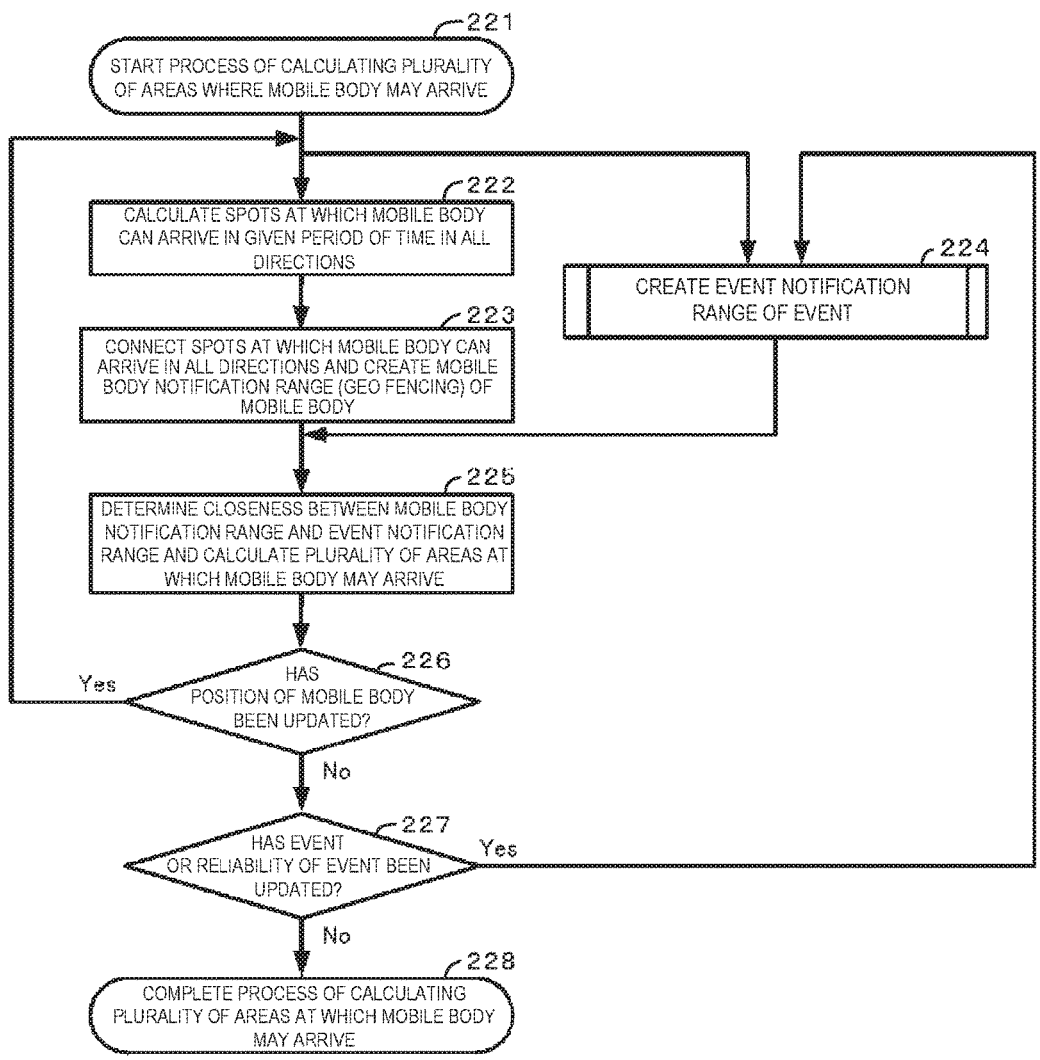
FIG. 2B is a flow chart for a process including the step of calculating a plurality of areas where the mobile body may arrive, the step being a part of the flow chart illustrated in FIG. 2A.

FIG. 2B is a flow chart for a process including the step illustrated in FIG. 2A as step 205 (the step of calculating a plurality of areas where the mobile body may arrive).

In step 221, the server computer (121) starts the process of calculating a plurality of areas where the mobile body may arrive.

In step 222, the server computer (121) optionally calculates a reachable point at which the mobile body can arrive in a given period of time in all direction of the mobile body.

The reachable point may be calculated, for example, by using the dynamic map information on the basis of the following function:

reachable point=$f$(speed of mobile body,connection of road,the number of branches of intersection, flow volume of road,history information).

The speed of a mobile body may be calculated, for example, by using information from a speed sensor of the mobile body. The connection of a road is a connection of a road where the event is occurring, and is extracted by using the dynamic map information. The number of branches of an intersection is the number of roads where a mobile body can choose to travel on at the intersection, and is extracted by using the dynamic map information. The history information may be travelling history information of the mobile body or travelling history information of mobile bodies that has traveled on the road (such as history information obtained by arithmetic processing such as averaging).

In step 223, the server computer (121) optionally connects the reachable points of the mobile body in all directions (that is, the points at which the mobile body can arrive in a set time) to create a mobile body notification range (geo fencing) of the mobile body, by using the dynamic map information.

In step 224, the server computer (121) creates an event notification range of the event by using the dynamic map information.

The event notification range of the event is calculated, for example, by using the dynamic map information on the basis of the following function:

event notification range=f(reliability of event,connection of road,the number of branches of intersection,type of event,history information).

As described above, the reliability of an event may be calculated on the basis of an information source of the event, frequency of reporting the same event, or a combination of the information source and the frequency. The connection of a road is a connection of a road where the event is occurring, and is extracted by using the dynamic map information. The number of branches of an intersection is the number of roads where a mobile body can choose to travel on at the intersection, and is extracted by using the dynamic map information. The type of an event may be based on categories of event, such as an accident or an obstacle on a road. The history information may be an event notification range set for another event of the same or similar type.

In step 225, the server computer (121) determines the closeness between the mobile body notification range created in step 223 and the event notification range created in step 224, and calculates a plurality of areas where the mobile body may arrive. The server computer (121) may determine the closeness on the basis of the dynamic map information. The server computer (121) may determine the closeness by using, for example, a spatial positional relationship or edges. If steps 222 and 223 are not executed, however (that is, if the mobile body notification range is not created), the server computer (121) determines whether the position of the mobile body is included in the event notification range. If the position of the mobile body is included in the event notification range, the server computer (121) determines that the event affects the mobile body. On the other hand, if the position of the mobile body is not included in the event notification range, the server computer (121) determines that the event does not affect the mobile body.

In step 226, the server computer (121) determines whether the current position of the mobile body has been updated. The server computer (121) determines whether the current position of the mobile body has been updated by using GPS information from the mobile body, access point connection information for connecting to a network, or connection information for connecting to a base station of cellular phones, for example. If the position of the mobile body has been updated, the server computer (121) returns the process to step 222 and repeats steps 222 to 225. On the other hand, if the current position of the mobile body has not been updated for a given period of time, for example, the server computer (121) forwards the process to step 227.

In step 227, the server computer (121) determines whether the event or the reliability of the event has been updated. If the event or the reliability of the event has been updated, the server computer (121) returns the process to step 224 and repeats steps 224 to 226. On the other hand, if the event and the reliability of the event have not been updated, the server computer (121) forwards the process to a final step 228.

In step 228, the server computer (121) completes the process of calculating a plurality of areas where the mobile body may arrive.

The step of creating the mobile body notification range illustrated in FIG. 2B as steps 222 and 223 will be further described with reference to steps 242 to 246 and steps 248 to 249 illustrated in FIG. 2D.

Also, the step of creating the event notification range illustrated in FIG. 2B as step 224 will be further described with reference to the whole flow chart illustrated in FIG. 2C.

Also, the step of determining the closeness between the mobile body notification range and the event notification range illustrated in FIG. 2B as step 225 will be further described with reference to step 247 illustrated in FIG. 2D.

Figure 2C:
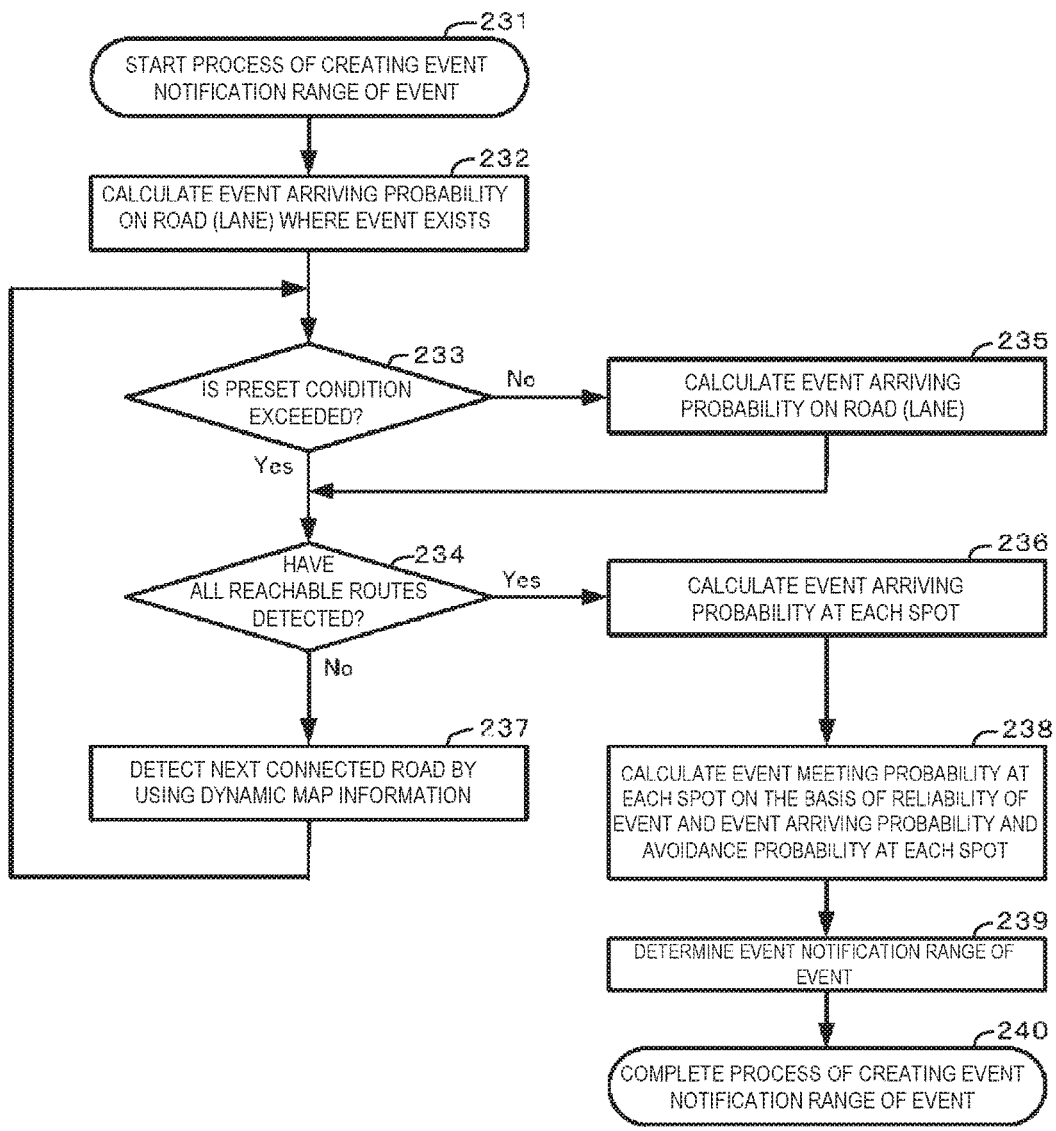
FIG. 2C is a flow chart for a process including the step of calculating an event notification range of an event, the step being a part of the flow chart illustrated in FIG. 2B.

FIG. 2C is a flow chart for the process illustrated in FIG. 2B as step 224 (the process of calculating an event notification range of an event).

In step 231, the server computer (121) starts the process of calculating an event notification range of an event and the process of determining the closeness between the mobile body notification range and the event notification range. The server computer (121) starts the process in response to the occurrence of a new event, the update of an existing event (such as the increase of the reliability of the event), or the update of the dynamic map information, for example.

In step 232, in response to the reception of the occurrence of an event, the server computer (121) calculates an event arriving probability on a road (or lane) where the event exist (that is, an event arriving probability on an edge, or an event arriving probability on an edge that is integrated first).

In step 233, the server computer (121) determines whether a set condition is exceeded. The set condition may be, for example, the distance from the event or the number of branches at an intersection. If the present condition is exceeded, the server computer (121) forwards the process to step 234. On the other hand, if the present condition is not exceeded, the server computer (121) forwards the process to step 235.

In step 234, in response to the determination that the set condition is exceeded, the server computer (121) determines whether all reachable routes have been detected. If the all reachable routes have been detected, the server computer (121) forwards the process to step 236. On the other hand, if the all reachable routes have not been detected, the server computer (121) forwards the process to step 237.

In step 235, in response to the determination that the set condition is not exceeded, the server computer (121) calculates an event arriving probability on the road (or lane) (that is, an event arriving probability on an edge, or an event arriving probability on an edge that is connected next). The server computer (121) may weigh the event arriving probability on the basis of the distance from the event and the number of branches of intersections existing between the event and the event notification range, for example. Because the event notification range is calculated on an event side independent from the mobile body, the event arriving probability is weighted on the basis of the distance from the event and the number of branches of intersections (not the traveling direction of the mobile body or the distance from the mobile body), for example. Also, the server computer (121) counts the number of intersections, or avoidance possibility, at which the mobile body can possibly choose an alternative branch. Also, if an intersection has history data (for example, the intersection has three branches and, of all mobile bodies that have passed through the intersection, 70% have turned right, 10% have gone straight, and 20% have turned left), the server computer (121) may use the history data for weighting an event arriving probability as the event arriving probability is calculated, for example.

In step 236, in response to the determination that all reachable routes have been detected, the server computer (121) calculates an event arriving probability at each spot. The each spot means an intersection of roads, which is a separation point of roads used in integration processing looped in steps 232 to 235 and step 237 illustrated in FIG. 2C.

In step 237 the server computer (121) detects a next connected route (e.g., a road) by using the dynamic map information. The server computer (121) then returns the process to step 233 and repeats the process from step 233. In other words, the server computer (121) repeats the process on all reachable routes. By repeating the process, the server computer accumulates the distance and the number of branches of intersections. With this accumulation, the server computer (121) can weigh the event arriving probability.

In step 238, the server computer (121) calculates, on the basis of the reliability of the event and the avoidance possibility calculated from the event arriving probability at each spot at which the mobile body can arrive and the avoidance position, an event encountering probability at each spot. Here, as described in step 236, the each spot means an intersection of roads, which is a separation point of roads used in integration processing looped in steps 232 to 235 and step 237 illustrated in FIG. 2C. As the reliability of the event changes, the event encountering probability also changes. For example, as the reliability of the event increases, the event encountering probability increases.

In step 239, the server computer (121) determines the event notification range of the event. Because the event encountering probability changes as the reliability of the event changes, the event notification range also changes. For example, because the event encountering probability increases as the reliability of the event increases, the event notification range also expands. Also, the event notification range may be, for example, a warning notification area whose encountering probability is 80% or more or that includes a final avoidance position (displayed in red), or a warning notification area whose encountering probability is 50% or more or that includes two avoidance positions (displayed in yellow).

Also, in step 239, the server computer (121) saves, in addition to the event notification range of the event, the event arriving probability calculated in step 236 and the event encountering probability calculated in step 238. The saved event arriving probability and the saved event encountering probability are used in step 206 of FIG. 2A (calculating the arriving probability for the event at the point Y), step 207 in FIG. 2A (extracting the avoidance position existing between the event and the point X), and step 208 (calculating the encountering probability).

In step 240, the server computer (121) completes the process of calculating the event notification range of the event.

Figure 2D:
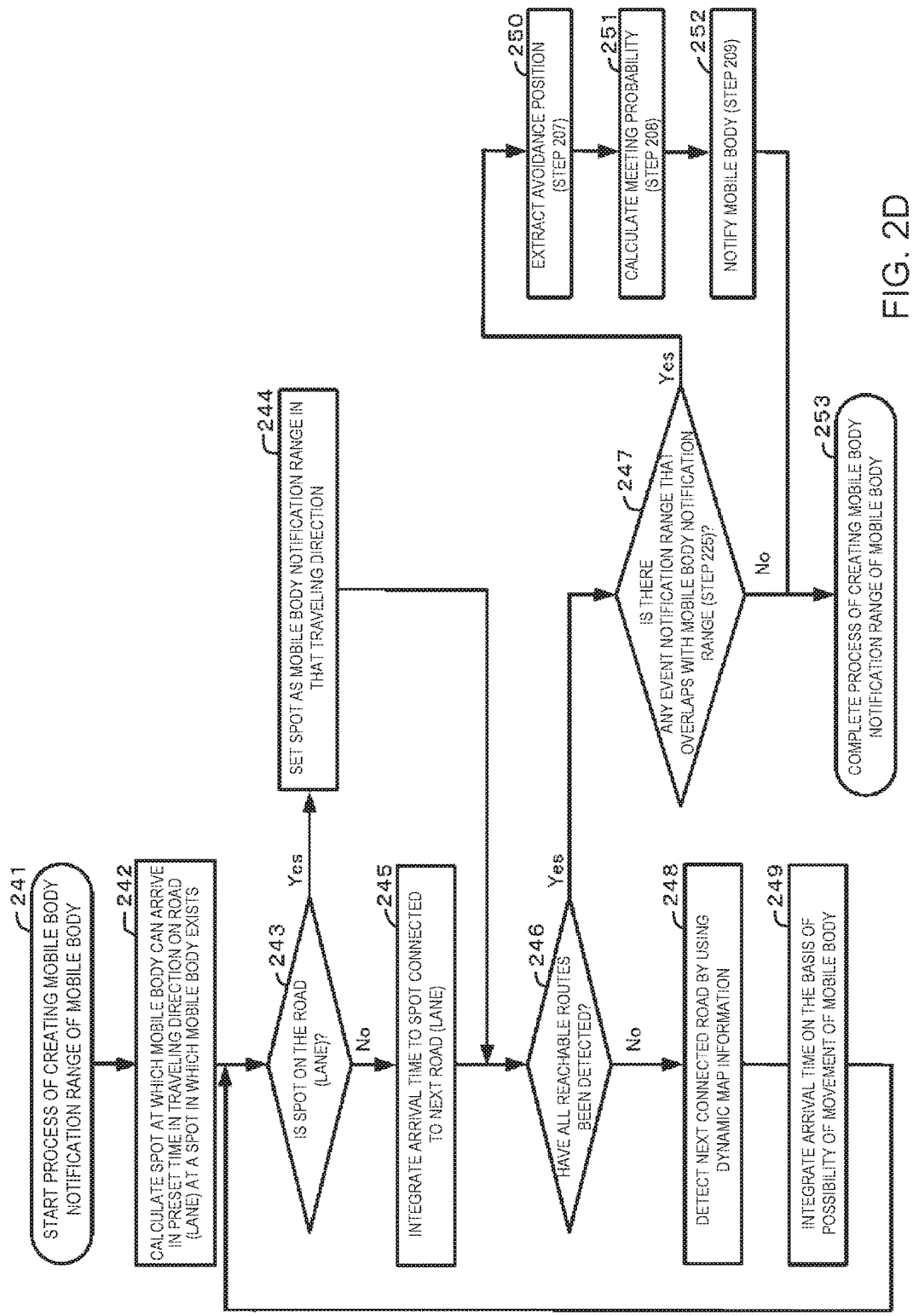
FIG. 2D is a flow chart for a process including the step of calculating a mobile body notification range of the mobile body and the step of determining the closeness between the mobile body notification range and the event notification range, the steps being a part of the flow chart illustrated in FIG. 2B.

FIG. 2D is a flow chart for a process including the process illustrated in FIG. 2B as steps 222 to 223 (calculating the mobile body notification range of the mobile body) and the process illustrated in FIG. 2B as step 225 (determining the closeness between the mobile body notification range and the event notification range).

In step 241, the server computer (121) starts the process that includes the process of calculating the mobile body notification range of the mobile body and the process of determining the closeness between the mobile body notification range and the event notification range.

In step 242, the server computer (121) calculates, in response to movement of the mobile body or reception of a periodic trigger, a spot at which the mobile body would arrive in a set time in a traveling direction of a road (or lane) at a spot in which the mobile body exists. The periodic trigger may be, for example, periodic (e.g., every few seconds) reception of car probe data (including current location data in latitude and longitude) from the mobile body, establishment of a communication network connection with the mobile body (for example, in the case of emergency connection, or in the case the mobile body connects to a roadside device and communicates with the server computer via the roadside device), a particular operation of the mobile device (e.g., change of a traveling direction of the mobile body), or traveling of the mobile body for a given distance.

In step 243, the server computer (121) determines whether the spot at which the mobile body arrives in the set time is on the road (or lane) at the spot in which the mobile body exists. If the spot at which the mobile body arrives in the set time is on the road (or lane) at the spot in which the mobile body exists, the server computer (121) forwards the process to step 244. On the other hand, if the spot at which the mobile body arrives in a set time is not on the road (or lane) at the spot in which the mobile body exists, the server computer (121) forwards the process to step 245.

In step 244, in response to the determination that the spot at which the mobile body arrives in a set time is on the road (or lane) at the spot in which the mobile body exists, the server computer (121) sets the spot at which the mobile body arrives in a set time as a mobile body notification range in that traveling direction. The server computer (121) calculates the mobile body notification range of the mobile body on the basis of the current speed of the mobile body and the driving history of the mobile body.

In step 245, in response to the determination that the spot at which the mobile body arrives in a set time is not on the road (or lane) at the spot in which the mobile body exists, the server computer (121) integrates an estimated arrival time for arriving at a spot connected to a next road (or lane) (that is, an estimated arrival time for arriving at an end point in the same edge).

In step 246, the server computer (121) determines whether all reachable routes have been detected. If the all reachable routes have been detected, the server computer (121) forwards the process to step 247. On the other hand, if the all reachable routes have not been detected, the server computer (121) forwards the process to step 248.

In step 247, in response to the determination that all reachable routes have been detected, the server computer (121) determines whether there is any event notification range that overlaps with the mobile body notification range. If there is any event notification range that overlaps with the mobile body notification range, the server computer (121) forwards the process to step 250. On the other hand, if there is no event notification range that overlaps with the mobile body notification range, the server computer (121) forwards the process to a final step 253.

In step 248, in response to the determination that all reachable routes have not been detected, the server computer (121) detects a next connected route (e.g., a road) by using the dynamic map information.

In step 249, the server computer (121) integrates an estimated arrival time to an end of each edge calculated for each edge on the basis of the possibility that the mobile body moves (for example, moves on an alternative branch). Also, on the basis of a traveling direction of the mobile body at an intersection, the server computer (121) may integrates +0 second for going straight, +5 seconds for lane change, +15 seconds for left turn, +30 seconds for right turn, and +60 seconds for U-turn as an estimated arrival time.

In step 250, the server computer (121) extracts an avoidance position that allows the mobile body to avoid arriving at a region affected by the event by using the dynamic map information. Step 250 corresponds to step 207 in FIG. 2A.

In step 251, the server computer (121) calculates the encountering probability of meeting the region affected by the event on the basis of the reliability of the event, the estimated arrival time and the arriving probability, and the avoidance position extracted in step 250. The step 251 corresponds to step 208 in FIG. 2A.

In step 252, if there is any event notification range that overlaps with the mobile body notification range, the server computer (121) gives a notification to the mobile body. Step 252 corresponds to step 209 in FIG. 2A.

In step 253, the server computer (121) completes the process that includes the process of calculating the mobile body notification range of the mobile body and the process of determining the closeness between the mobile body notification range and the event notification range.

Figure 3:
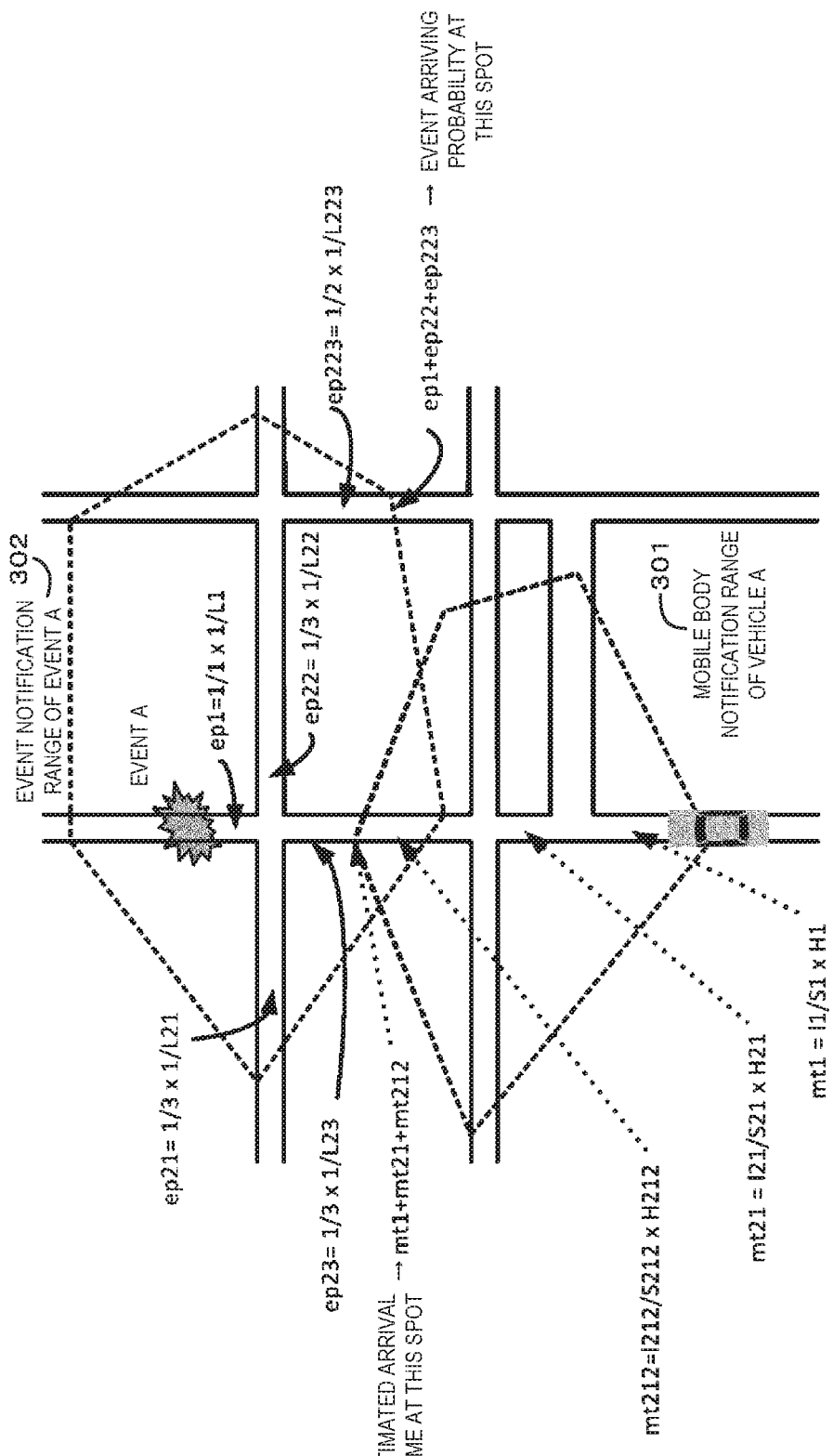
FIG. 3 is a diagram illustrating a concrete example of the step of calculating an encountering probability of meeting the region affected by an event, the step being a part of the flow chart illustrated in FIG. 2A.

FIG. 3 is a diagram illustrating a concrete example of the step of calculating the encountering probability of meeting the region affected by event, the step being a part of the flow chart in FIG. 2A.

As described in step 223 of FIG. 2B, a mobile body notification range (301) of a vehicle A is a notification range of a polygon (geo fencing) created by connecting spots at which the vehicle A can arrive (that is, spots at which the vehicle A can arrive in a set time) in all directions.

An event notification range (302) of an event A may be a notification range (geo fencing) created by enlarging or reducing, in accordance with the reliability of the event, a polygon created by connecting spots at which connection of roads or the number of branches of intersections are expected to reach a set condition.

The estimated arrival time of the vehicle A is calculated on the basis of a speed (Sxx) of a mobile body, a distance (lxx) from a start point of each edge, and driving history information (Hxx). An example of calculating the estimated arrival time is as follows. For example, the estimated arrival time of the vehicle A is represented with mtxx=(lxx/Sxx)☐Hxx, where mtxx is a required time of each edge. In FIG. 3, the estimated arrival times at four spots are illustrated.

In the example shown in FIG. 3, the server computer (121) calculates an estimated arrival time for arriving at a spot connected to a next road (or lane) (see step 245 in FIG. 2D) as an estimated arrival time for arriving at an end of an edge in the same edge (mt1, mt2, and mt212).

Also, in FIG. 3, the server computer (121) integrates estimated arrival times for arriving at an end of each edge calculated for each edge (see step 249 in FIG. 2D) as follows:

An estimated arrival time for a first edge: mt1
An estimated arrival time for a next edge: mt1+mt21
An estimated arrival time for a last edge: mt1+mt21+mt212

The event arriving probability is weighted in accordance with a traveling direction on a road, a distance (Lxx) (length of each edge), and the number of branches of intersections. The example calculation of the event arriving probability is as follows. For example, an event arriving probability of each edge (see steps 232 and 235 in FIG. 2C) epxx is represented as epxx=⅓ (the number of directions for branching−if no driving history information exists)☐1/Lxx (inverse to distance).

Here, ep1 is an event arriving probability on a road (or lane) at a spot in which the event A exist and is calculated in accordance with step 232 in FIG. 2C. Also, ep2, ep23, and ep223 are event arriving probabilities on the load (or lane) and are calculated in accordance with step 235 in FIG. 2C. For example, ep1+ep22+ep223 is an event arriving probability at a reachable spot and is calculated by integrating the event arriving probabilities at every roads (or lanes) in accordance with step 236 in FIG. 2C. In accordance with step 238 in FIG. 2C, the server computer (121) then calculates an event encountering probability at each spot on the basis of the reliability of the event, and the event arriving probabilities of every reachable spots (ep1+ep22+ep223) and an avoidance position.

Also, the event encountering probability of a mobile body (such as the vehicle A) for an event (such as the event A) is calculated in an overlapping portion between the mobile body notification range of the vehicle A and the event notification range of the event A as follows: the arriving probability at a point having the highest arriving probability*reliability of event*avoidance possibility.

Regarding step 206 in FIG. 2A, the server computer (121) in the example illustrated in FIG. 3 calculates the estimated arrival time and the arriving probability on the basis of how the event notification range of each event affecting the mobile body calculated in step 205 overlaps with the mobile body notification range of the mobile body as described below.

The server computer (121) calculates a point of the event notification range that extends most deeply into the mobile body notification range (a point corresponding to the arriving probability ep1+ep23 of the event A; hereinafter referred to as "point X") and a point of the mobile body notification range that extends most deeply into the event notification range (a point corresponding to the estimated arrival time mt1+mt21+mt212; hereinafter referred to as "point Y"), calculates the estimated arrival time of the mobile body at the point X and the arriving probability for the event A at the point Y, and adopts them as the estimated arrival time and the arriving probability of the mobile body for arriving at a region affected by the event A.

Figure 4:
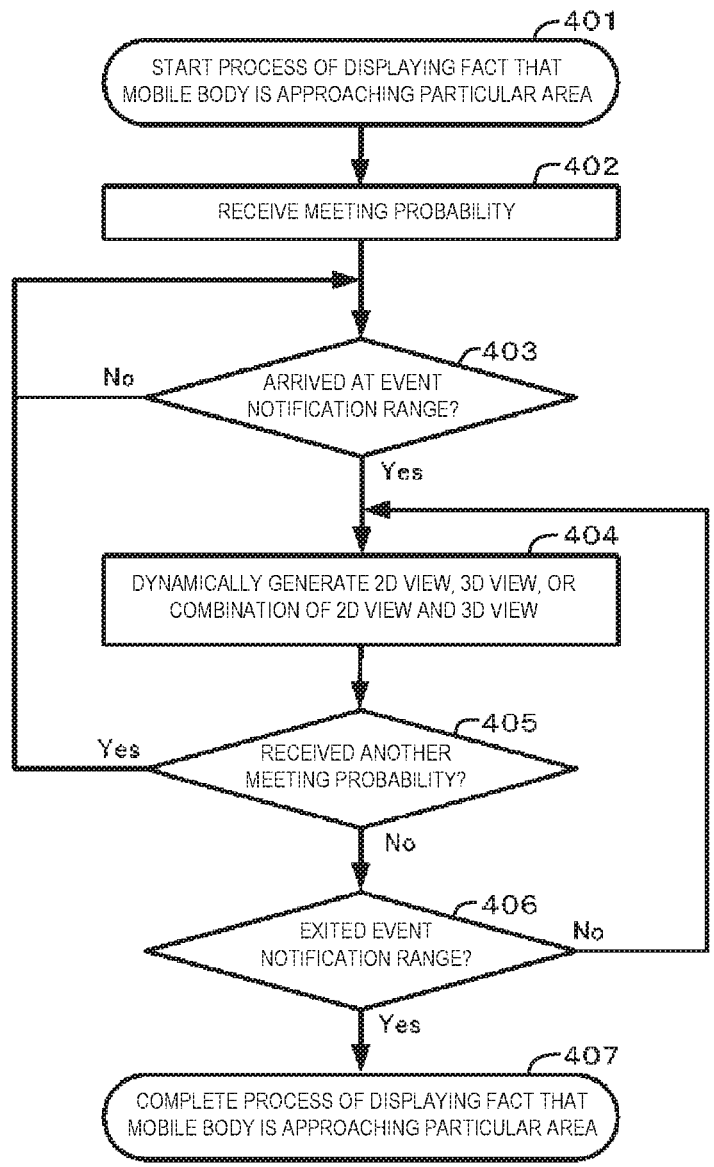
FIG. 4 is a flow chart for a process of displaying, in a mobile body that is notified that the mobile body is approaching a particular area in accordance with an embodiment of the present invention, the fact that the mobile body is approaching a particular area.

FIG. 4 is a flow chart for a process of displaying, in a mobile body that is notified that the mobile body is approaching a particular area in accordance with an embodiment the present invention, the fact that the mobile body is approaching a particular area.

In step 401, the mobile body starts the process of displaying the fact that the mobile body is approaching a particular area.

In step 402, the mobile body receives an encountering probability from the server computer (121) via a wireless network. Also the mobile body receives, along with the encountering probability, the mobile body notification range (geo fencing) of the mobile body and a level of the encountering probability.

In step 403, the mobile body determines whether the mobile body has arrived at the event notification range. Whether the mobile body has arrived at the event notification range can be determined on the basis of GPS information of the mobile body itself, for example. If the mobile body has arrived at the event notification range, the mobile body forwards the process to step 404. On the other hand, if the mobile body has not arrived at the event notification range, the mobile body returns the process to step 403.

In step 404, the mobile body displays the fact that the mobile body is approaching a particular area on a screen. In other words, the mobile body dynamically generates a view on the basis of the encountering probability. The view may be a 2D view, a three-dimensional view, or combination of a 2D view and a three-dimensional view, for example.

If the view is a two-dimensional (hereinafter also referred to as 2D) view, for example, the mobile body may display a guide map on the view and may display a type of an event, an area where an event occurs, and the encountering probability of meeting a region affected by an event on the guide map.

If the view is a three-dimensional (hereinafter also referred to as 3D) view, for example, the mobile body may display a part of a guide map (such as an intersection or a lane) in an enlarged manner on the view and may display a level of risk for each traveling direction or alternative direction at the intersection or on the lane on the enlarged guide map. The level of risk may be represented in accordance with the encountering probability.

In step 405, the mobile body receives another encountering probability and determines whether the encountering probability has been updated. If the encountering probability has been updated, the mobile body returns the process to step 403 and repeats steps 403 to 405. On the other hand, if the encountering probability has not been updated, the mobile body forwards the process to step 406.

In step 406, the mobile body determines whether the mobile body has exited the event notification range. If the mobile body has exited the event notification range, the mobile body forwards the process to a final step 407. On the other hand, if the mobile body has not exited the event notification range, the mobile body returns the process to step 404 and repeats steps 404 to 406.

In step 407, the mobile body completes the process of displaying the fact that the mobile body is approaching a particular area.

Figure 5A:
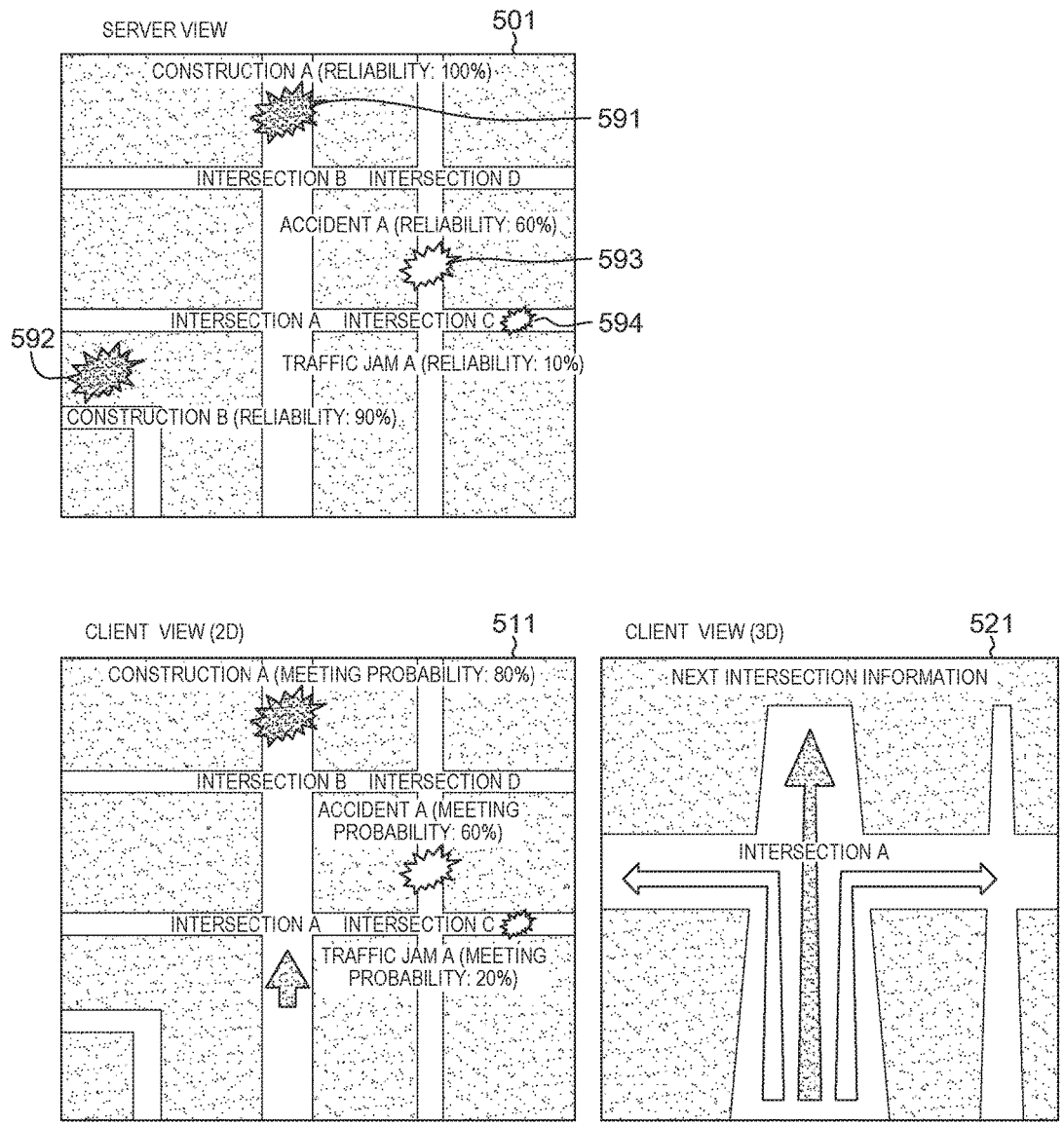
FIG. 5A is a diagram illustrating a server view in which a type of an event and a reliability of the event are displayed, a client view (two-dimensional view, hereinafter also referred to as "2D view") in which a type of an event and an encountering probability of meeting an region affected by the event are displayed, and a client view (three-dimensional view, hereinafter also referred to as "3D view") in which the encountering probability for each traveling direction or alternative direction is displayed.
Figure 5B:
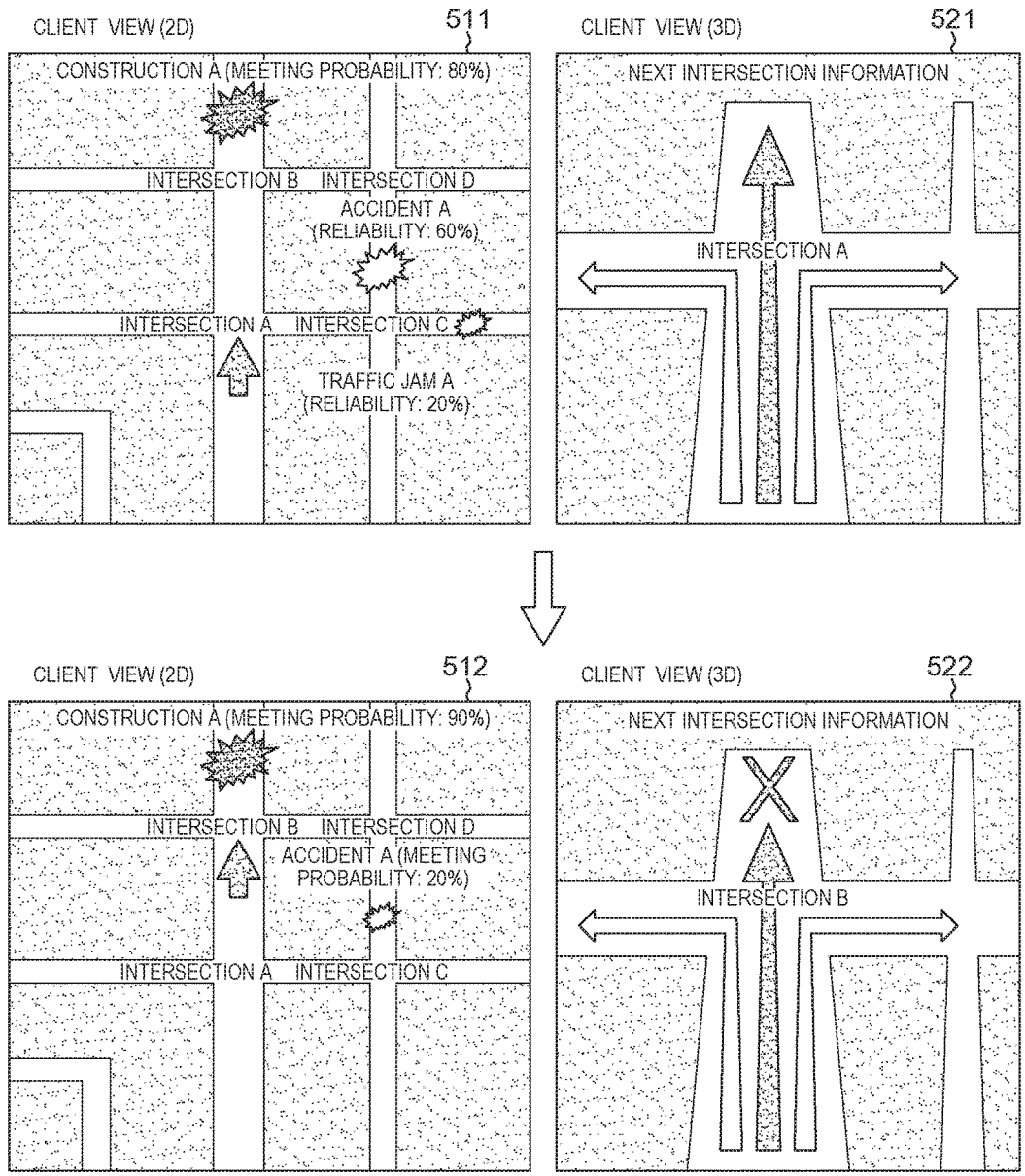
FIG. 5B is a diagram illustrating client views (2D views) in which a type of an event and an encountering probability of meeting an region affected by the event are displayed in a temporally changing manner and client views (3D views) in which the encountering probability for each traveling direction or alternative direction is displayed in a temporally changing manner.

FIGS. 5A and 5B illustrate a server view and client views that may be used in an embodiment of the present invention.

FIG. 5A illustrates a server view (501) in which a type of an event and a reliability of the event are displayed, a client view (2D view) (511) in which a type of an event and an encountering probability of meeting an region affected by the event are displayed, and a client view (three-dimensional view) (521) in which the encountering probability for each traveling direction or alternative direction is displayed.

The server view (501) is displayed on a display device of the server computer (121). The server computer (121) stores data about a position (e.g., latitude and longitude) where an event occurs, a type of an event (construction, accident, or traffic jam), and a reliability of an event.

The server view (501) displays, on the guide map, a type of various events (construction, accident, or traffic jam) and a reliability of each of the various events (100% for a construction A (591), 90% for a construction B (592), 60% for an accident A (593), and 10% for a traffic jam A (594)). Also, in order to help users to visually understand a reliability of various events, the server view (501) may display a reliability of each event as an icon in one of three warning levels: red (reliability is high), yellow (reliability is intermediate), or gray (reliability is low). Alternatively, in order to help users to visually understand a reliability of various events, the server view (501) may display a larger icon as the reliability becomes higher.

Each of the client views (511 and 521) is displayed on a display device associated with a mobile body (such as a vehicle) (represented with an up arrow). Each of the client views (511 and 521) is displayed on a display screen when the mobile body is approaching an intersection A.

The mobile body receives and stores data about a position (e.g., latitude and longitude) where an event occurs, a type of the event (e.g., construction, accident, or traffic jam), and an encountering probability from the server computer (121).

The client view (511) is a 2D view, for example, but it may be a 3D view. The client view (511) displays a map of the vicinity of the mobile body on the guide map. Also, the client view (511) displays a position where an event occurs, a type of the event, and an encountering probability.

The client view (511) displays a position where an event occurs, a type of the event, and an encountering probability in response to the server view (501). The client view (511), however, does not display a reliability of an event on the server view (501) but displays an encountering probability.

The client view (511) displays positions and types of events corresponding to the construction A (591), the accident A (593), and the traffic jam A (594) on the server view (501). The client view (511), however, does not display a position and a type of an event corresponding to the construction B (592) on the server view (501). This is because the construction B (592) is occurring on the current guide map of the client view (511) but the current position of the mobile body is not connected to the position of the construction B, making the encountering probability of the mobile body for the construction B a value close to zero.

The client view (521) is a 3D view, for example, but it may be a 2D view. For example, the client view (521) may be displayed on the client view (511) in a superimposed manner so as not to overlap with the mobile body and events displayed on the client view (511). Alternatively, the client view (521) and the client view (511) may be displayed side by side on a screen, for example.

In order to display traveling directions at the intersection A through which the mobile body will pass soon, the client view (521) is displaying the vicinity of the intersection A in an enlarged manner.

The client view (521) may display risk and avoidance information for each traveling direction at the intersection A through which the mobile body will pass soon by using a colored arrow. If the mobile body goes straight through the intersection A, there is the construction A with the encountering probability of 80% (the encountering probability is high) ahead of the mobile body, and the next intersection, or an intersection B, is the last avoidance point. Thus, the arrow representing the straight direction is displayed in red (indicating that the risk is high). If the mobile body turns right at the intersection A, there are the accident A with the encountering probability of 60% and the traffic jam A with the encountering probability of 20% ahead of the mobile body, depending on how the mobile body moves. Because the encountering probabilities of these events are intermediate, the arrow representing the right turn is displayed in yellow (indicating that the risk is intermediate). If the mobile body turns left at the intersection A, there is no event ahead of the mobile body. Thus, the arrow indicating the left turn is displayed in green (indicating that the risk is low).

A user can easily select a traveling direction for avoiding events by seeing the client views (511 and 521).

FIG. 5B is a diagram illustrating client views (2D views) in which a type of an event and an encountering probability of meeting a region affected by the event are displayed in a temporally changing manner and client views (3D views) in which the encountering probability for each traveling direction or alternative direction is displayed in a temporally changing manner.

The client view (511) and the client view (521) illustrated in FIG. 5B are respectively the same as the client view (511) and the client view (521) illustrated in FIG. 5A. Thus, the client view (511) and the client view (521) are displayed on a display screen when the mobile body is approaching the intersection A.

The client views (512 and 522) are views displayed after a certain amount of time has elapsed since the client views (511 and 521) are displayed. Each of the client views (512 and 522) is displayed on a display device associated with the mobile body.

The client views (512 and 522) indicate that the mobile body (represented with an up arrow) has passed through the intersection A and is approaching the intersection B, getting closer to an area where the event (the construction A) exists.

Unlike the client view (511), the client view (512) does not display the position and the type of the event (the traffic jam A) by which the mobile body has passed.

Also, in the client view (512), because the mobile body has passed through the intersection A and the encountering probability for the accident A has decreased from 60% to 20%, the color of the icon representing the accident A has changed from yellow in the client view (511) to gray. The encountering probability has decreased from 60% to 20% because the arriving probability has decreased. Also, alternatively, in the client view (512), because the mobile body has passed through the intersection A and the encountering probability is decreased from 60% to 20%, the icon representing the accident A is displayed smaller than that in the client view (511).

Also, in the client view (512), the mobile body is getting closer to the construction A and the encountering probability has increased from 80% to 90%.

The client view (522) may display risk and avoidance information for each traveling direction at the intersection B through which the mobile body will pass soon by using a colored arrow. If the mobile body goes straight through the intersection B, there is the construction A with the encountering probability of 90% (the encountering probability is high) ahead of the mobile body, and the intersection B is the last avoidance point for avoiding the construction A. Thus, the arrow representing the straight direction is displayed in red (indicating that the risk is high). Also, if the mobile body goes straight through the intersection B, there is no avoidance route and the mobile body meets the route on which the construction A exists. Thus, a red cross mark is displayed above the arrow representing the straight direction. If the mobile body turns right at the intersection B, there is the accident A with the encountering probability of 20% ahead of the mobile body, depending on how the mobile body moves. Because this encountering probability is low, however, the arrow representing the right turn is displayed in pale yellow (indicating that the risk is lower than intermediate). If the mobile body turns left at the intersection A, there is no event ahead of the mobile body. Thus, the arrow indicating the left turn is displayed in green (indicating that the risk is low).

In this way, as the mobile body comes closer to the event (the construction A), the encountering probability increases and the display indicating the level of the encountering probability is updated accordingly. Thus, a user can easily select a traveling direction for avoiding the event by seeing the client views (512 and 522).

Figure 6A:
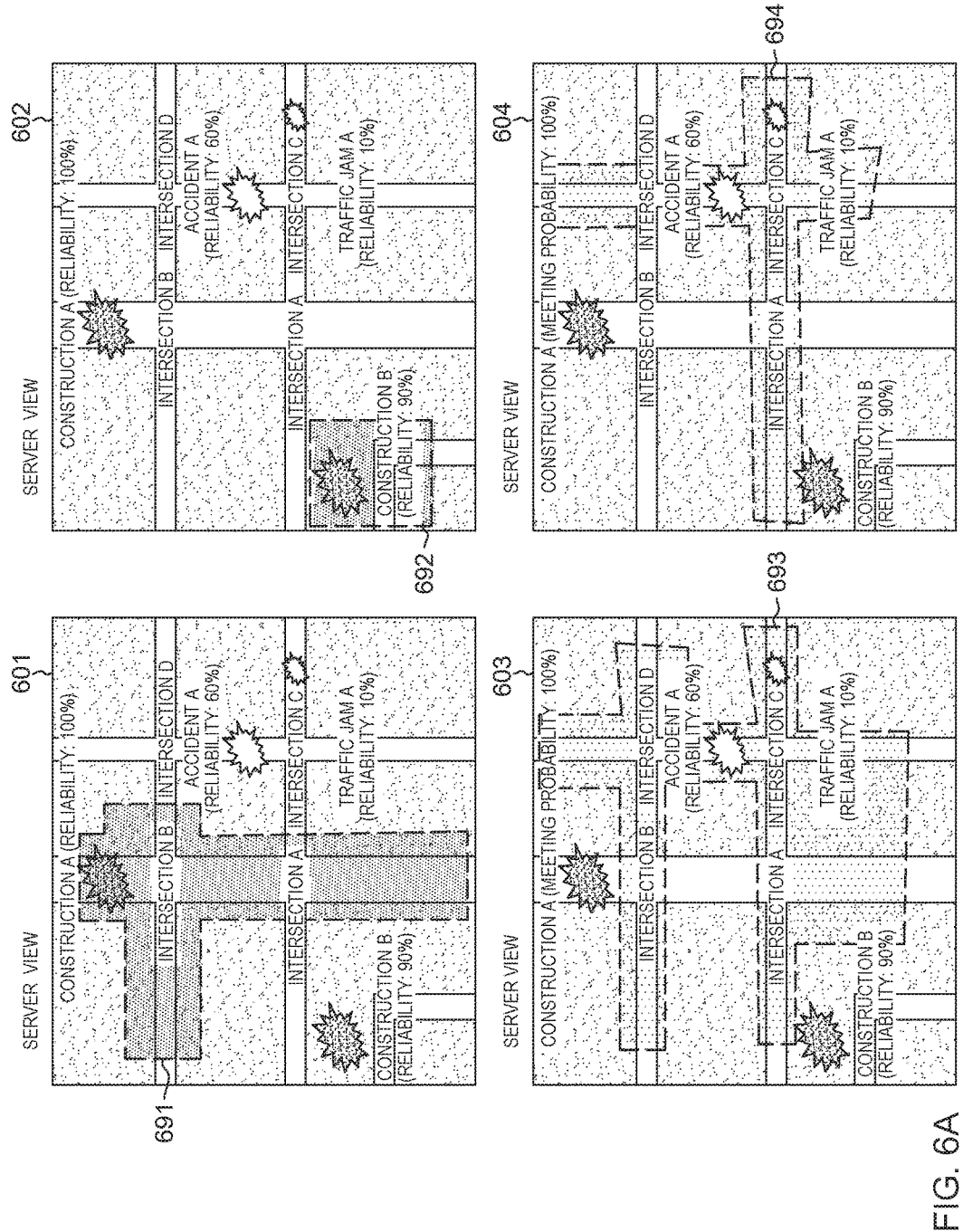
FIG. 6A is a diagram illustrating server views in which an event notification range of each event is displayed.
Figure 6B:
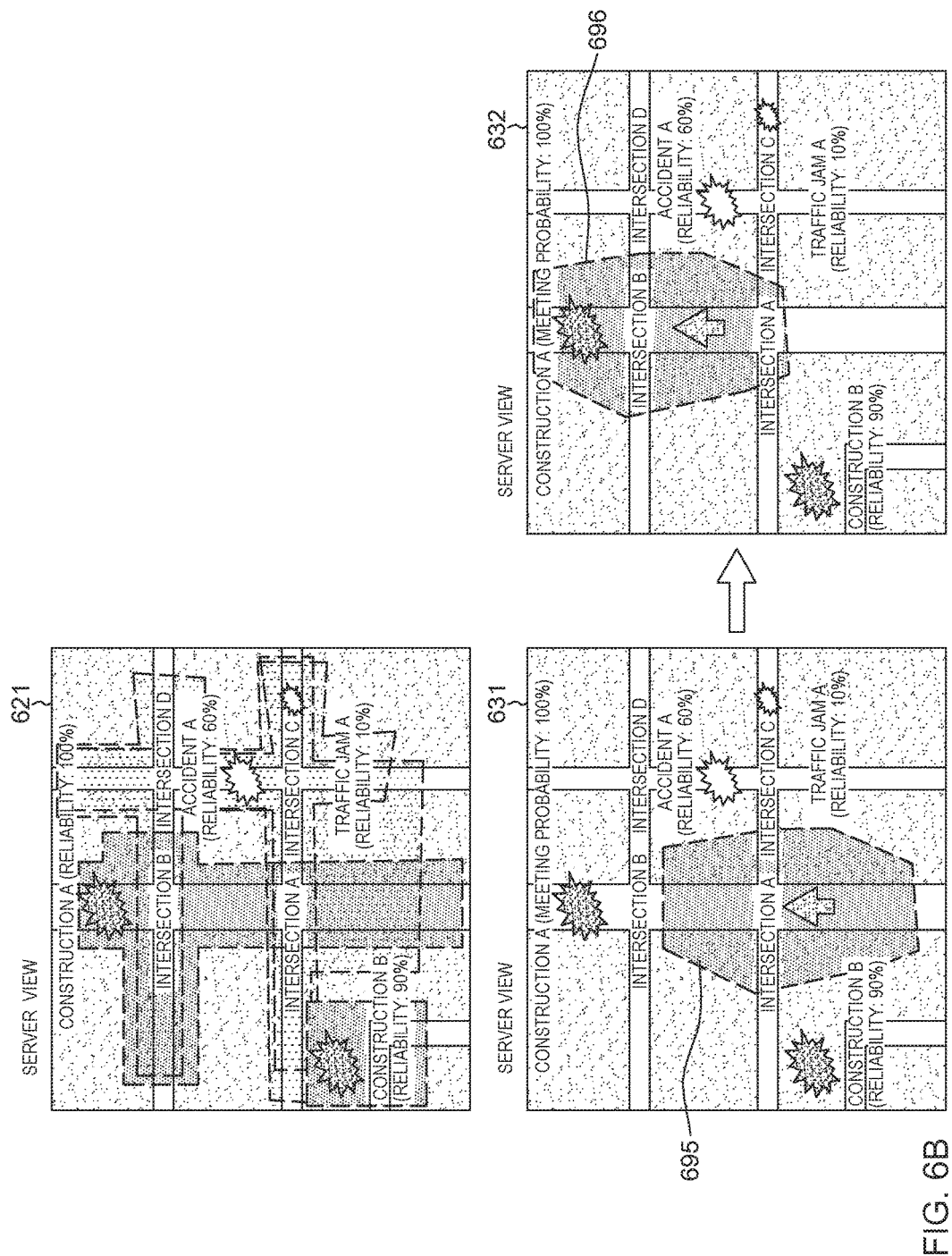
FIG. 6B is a diagram illustrating server views in which event notification ranges of events illustrated in FIG. 6A are displayed in a superimposed manner and in which a mobile body notification range is temporally displayed.
Figure 6C:
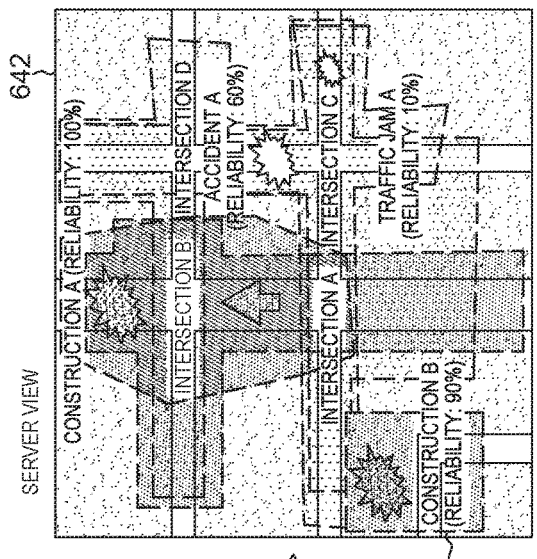
FIG. 6C is a diagram illustrating server views in which the event notification ranges in FIG. 6B and the mobile body notification range in FIG. 6B are displayed in a superimposed manner.
Figure 6C:
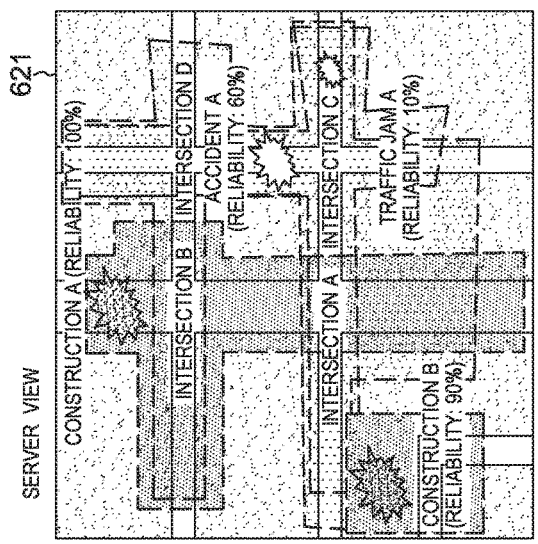
Figure 6C:
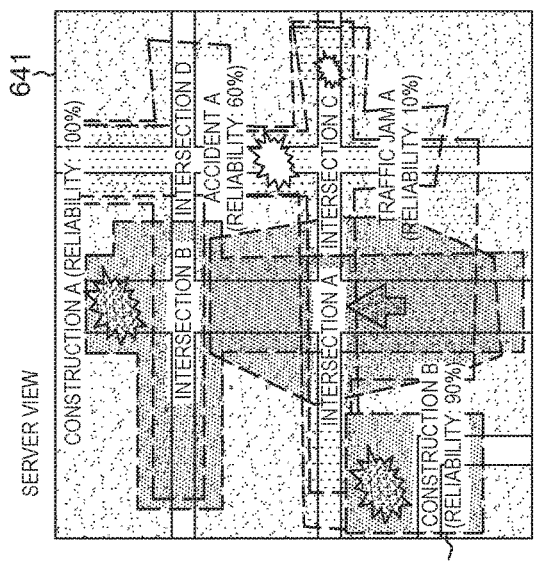

FIGS. 6A to 6C illustrate the aspects illustrated in FIGS. 5A to 5B, wherein the closeness between an event notification range and a mobile body notification range increases or decreases.

FIG. 6A is a diagram illustrating server views in which the event notification ranges of the construction A, the construction B, the accident A, and the traffic jam A are respectively displayed.

A server view (601) displays an event notification range (691) of the construction A as a polygon that is drawn with a dotted line and that has a translucent color (such as a translucent red, because the reliability is high (100%)).

A server view (602) displays an event notification range (692) of the construction B as a polygon that is drawn with a dotted line and that has a translucent color (such as a translucent red, because the reliability is high (90%)).

A server view (603) displays an event notification range (693) of the accident A as a polygon that is drawn with a dotted line and that has a translucent color (such as a translucent yellow, because the reliability is intermediate (60%)).

A server view (604) displays an event notification range (694) of the traffic jam A as a polygon that is drawn with a dotted line and that has a translucent color (such as a translucent gray, because the reliability is low (10%)).

The event notification ranges may change in accordance with the reliability of the events, a connection of a road, the number of intersections, the type of the events, or history information.

FIG. 6B is a diagram illustrating server views in which the event notification ranges of the events illustrated in FIG. 6A (the construction A, the construction B, the accident A, and the traffic jam A) are displayed in a superimposed manner, and in which the mobile body notification range is displayed in a temporally changing manner.

The server view (621) displays the event notification ranges of the events illustrated in the server view (601), the server view (602), the server view (603), and the server view (604) in FIG. 6A in a superimposed manner.

In response to an instruction regarding a screen display from a server administrator, the server computer (121) may switch between the server view (601), the server view (602), the server view (603), the server view (604), and the server view (621), or may display at least two of these server views side by side on a screen.

A server view (631) displays a mobile body notification range (695) of the mobile body (represented with an up arrow) approaching the intersection A as a polygon that is drawn with a dotted line and that has a translucent color (such as a translucent blue).

A server view (632) displays a mobile body notification range (696) of the mobile body (represented with an up arrow) approaching the intersection B as a polygon that is drawn with a dotted line and that has a translucent color (such as a translucent blue).

FIG. 6C is a diagram illustrating server views in which event notification ranges and a mobile body notification range are displayed in a superimposed manner. The server view (621) illustrated in FIG. 6C is the same as the server view (621) illustrated in FIG. 6B.

A server view (641) displays the event notification ranges (691, 692, 693, and 694) of the events and the mobile body notification range (695) in a superimposed manner when the mobile body (represented with an up arrow) is approaching the intersection A. The mobile body notification range (695) is close to the event notification range (691) of the construction A, the event notification range (693) of the accident A, and the event notification range (694) of the traffic jam A, but is not close to the event notification range (692) of the construction B. Thus, in a client view corresponding to the server view (641), the event of the construction B is not displayed (see the client view (2D) (511) in FIG. 5A).

A server view (642) displays the event notification ranges (691, 692, 693, and 694) of the events and the mobile body notification range (696) in a superimposed manner when the mobile body (represented with an up arrow) is approaching the intersection B. The mobile body notification range (696) is close to the event notification range (691) of the construction A, the event notification range (693) of the accident A, and the event notification range (694) of the traffic jam A, but is not close to the event notification range (692) of the construction B. Thus, in a client view corresponding to the server view (642), the event of the construction B is not displayed (see the client view (2D) (512) in FIG. 5B). Also, although the mobile body notification range (696) is close to the event notification range (694) of the traffic jam A, the distance between the mobile body notification range (696) and the event notification range (694) of the traffic jam A is becoming larger because the mobile body has passed through the intersection A. Also, although the mobile body notification range (696) is close to the event notification range (693) of the accident A, the mobile body would arrive at the accident A only when the mobile body travels in a direction opposite to the current traveling direction of the mobile body. Also, the distance between the mobile body notification range (696) and the event notification range (693) of the accident A is becoming larger.

Figure 7A:
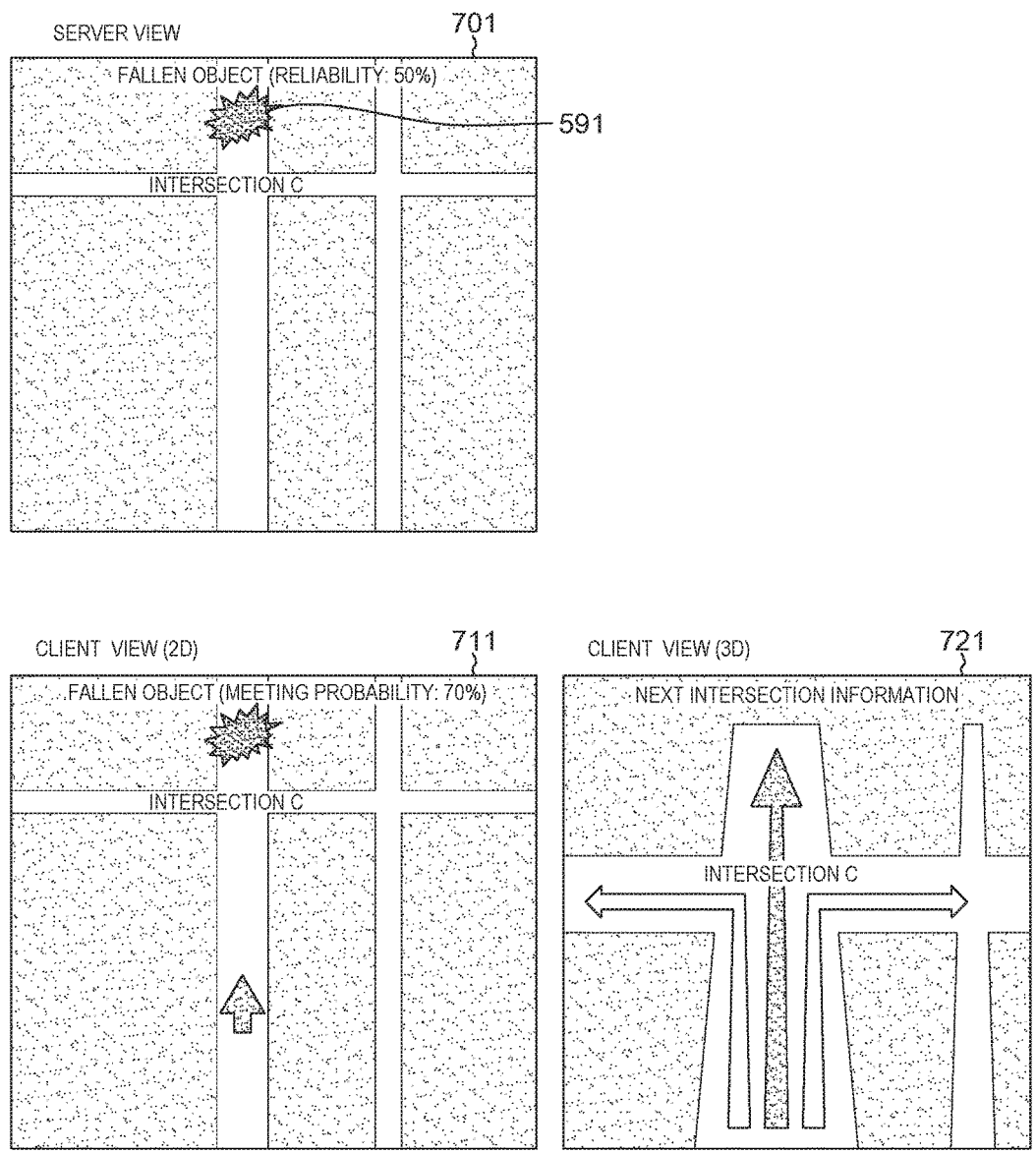
FIG. 7A is a diagram illustrating a server view in which a type of an event and a reliability of the event are displayed, a client view (2D view) in which a type of an event and an encountering probability of meeting a region affected by the event are displayed, and a client view (3D view) in which the encountering probability for each traveling direction or alternative direction is displayed.
Figure 7B:
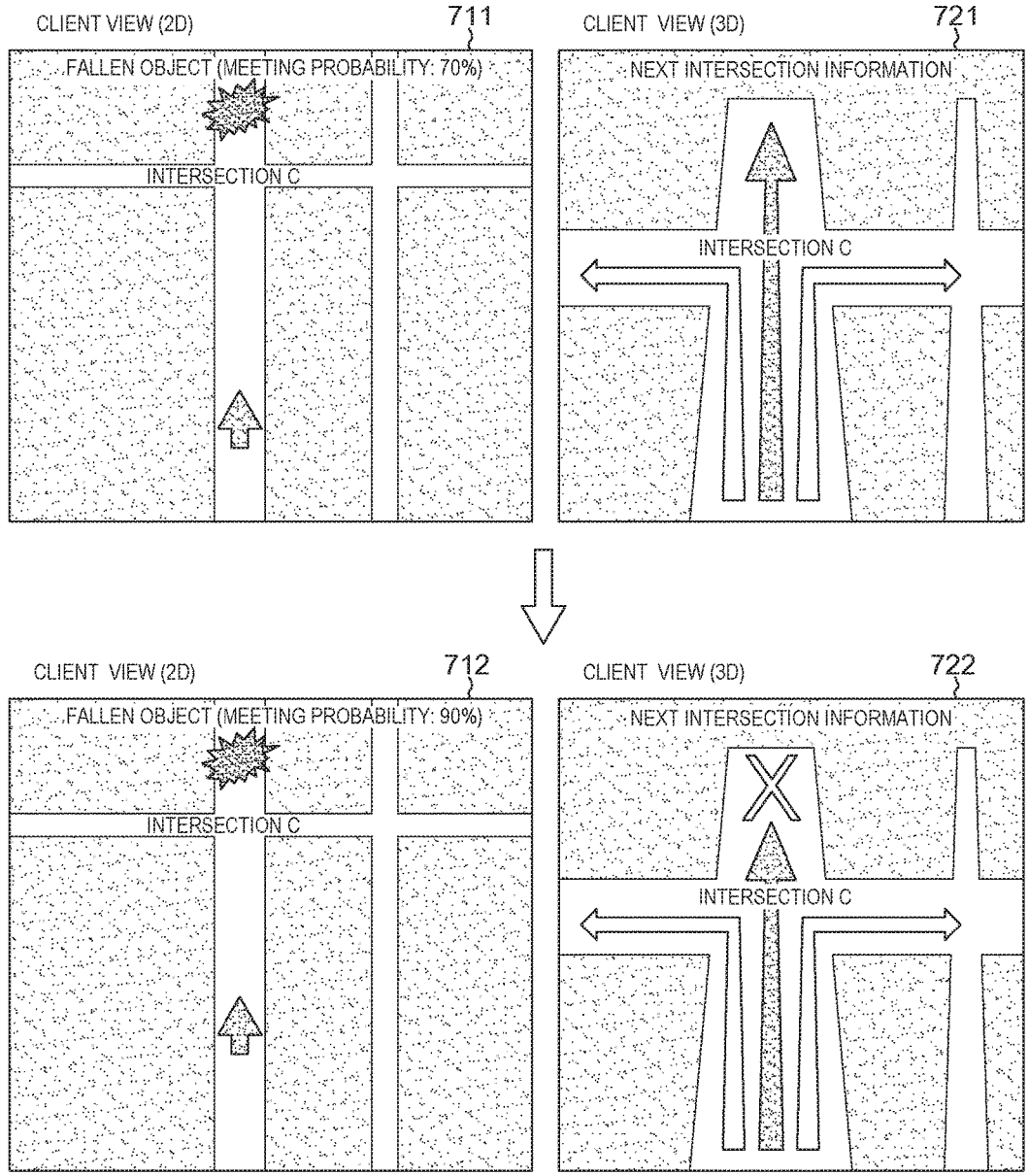
FIG. 7B is a diagram illustrating client views (2D views) in which a type of an event and an encountering probability of meeting a region affected by the event are displayed in a temporally changing manner, and client views (three-dimensional views) in which the encountering probability for each traveling direction or alternative direction is displayed in a temporally changing manner.

FIGS. 7A and 7B illustrate a server view and client views that may be used in an embodiment of the present invention.

FIG. 7A is a diagram illustrating a server view (701) in which a type of an event and a reliability of the event are displayed, a client view (2D view) in which a type of an event and an encountering probability of meeting a region affected by the event are displayed, and a client view (three-dimensional view) in which the encountering probability for each traveling direction or alternative direction is displayed.

The server view (701) is displayed on a display device of the server computer (121). The server computer (121) stores data about a position (e.g., latitude and longitude) where an event occurs, a type of the event (fallen object), and a reliability of the event.

The server view (701) displays the type of the event (fallen object) and the reliability (50%) of the fallen object on a guide map. Also, in order to help users to visually understand the reliability of the fallen object, the server view (701) may display the reliability of the fallen object as an icon in red, which is one of three warning levels of red (reliability is high), yellow (reliability is intermediate), and gray (reliability is low). Alternatively, in order to help users to visually understand the reliability of the fallen object, the server view (701) may display a larger icon as the reliability becomes higher.

Each of the client views (711 and 721) is displayed on a display device associated with the mobile body. Each of the client views (711 and 721) is displayed on a display screen when the mobile body (represented with an up arrow) is approaching an intersection C.

The mobile body receives and stores data about a position (e.g., latitude and longitude) where an event occurs, a type of the event (fallen object), and an encountering probability from the server computer (121).

The client view (711) is a 2D view, for example, but it may be a 3D view. The client view (711) displays a map of the vicinity of the mobile body on the guide map. Also, the client view (711) displays a position where an event occurs, a type of the event, and an encountering probability.

The client view (711) displays a position where an event occurs, a type of the event, and an encountering probability in response to the server view (701). The client view (711), however, does not display a reliability of an event on the server view (701) but displays an encountering probability.

The client view (721) is a 3D view, for example, but it may be a 2D view. For example, the client view (721) may be displayed on the client view (711) in a superimposed manner so as not to overlap with the mobile body and an event displayed on the client view (711). Alternatively, the client view (721) and the client view (711) may be displayed side by side on a screen, for example.

In order to display traveling directions at the intersection C through which the mobile body will pass soon, the client view (721) is displaying the vicinity of the intersection C in an enlarged manner.

The client view (721) may display risk and avoidance information for each traveling direction at the intersection C through which the mobile body will pass soon by using a colored arrow. If the mobile body goes straight through the intersection C, there is the fallen object with the encountering probability of 70% (the encountering probability is intermediate) ahead of the mobile body. Thus, the arrow representing the straight direction is displayed in yellow (indicating that the risk is intermediate). If the mobile body turns right or left at the intersection C, it is possible to avoid the fallen object. Thus, the arrows respectively representing the right turn and the left turn are displayed in green (indicating that the risk is low).

A user can easily select a traveling direction for avoiding the fallen object by seeing the client views (711 and 721).

FIG. 7B is a diagram illustrating client views (2D views) in which a type of an event and an encountering probability of meeting a region affected by the event are displayed in a temporally changing manner, and client views (three-dimensional views) in which the encountering probability for each traveling direction or alternative direction is displayed in a temporally changing manner.

The client view (711) and the client view (721) illustrated in FIG. 7B are respectively the same as the client view (711) and the client view (721) illustrated in FIG. 7A. Thus, the client view (712) and the client view (722) illustrated in FIG. 7B are displayed on a display screen when the mobile body is approaching the intersection C.

Each of the client views (712 and 722) is displayed on a display device associated with a mobile body.

Each of the client views (712 and 722) indicates that the mobile body (represented with an up arrow) is getting closer to the intersection C and thus to an area where the fallen object exists.

Also, the client view (712) indicates that the encountering probability of the mobile body for the fallen object has increased from 70% to 90% in a temporally changing manner.

The client view (722) may display risk and avoidance information for each traveling direction at the intersection C through which the mobile body will pass soon by using a colored arrow. If the mobile body goes straight through the intersection C, there is the fallen object with the encountering probability of 90% (the encountering probability is high) ahead of the mobile body. Thus, the arrow representing the straight direction is displayed in red (indicating that the risk is high). Also, if the mobile body goes straight through the intersection C, there is no avoidance route and the mobile body meets the route on which the fallen object exists. Thus, a red cross mark is displayed above the arrow representing the straight direction. If the mobile body turns right or left at the intersection C, it is possible to avoid the fallen object. Thus, the arrows respectively representing the right turn and the left turn are displayed in green (indicating that the risk is low).

In this way, as the mobile body comes closer to the event (the fallen object), the encountering probability increases and the display indicating the level of the encountering probability is updated accordingly. Thus, a user can easily select a traveling direction for avoiding the event by seeing the client views (712 and 722).

Figure 8A:
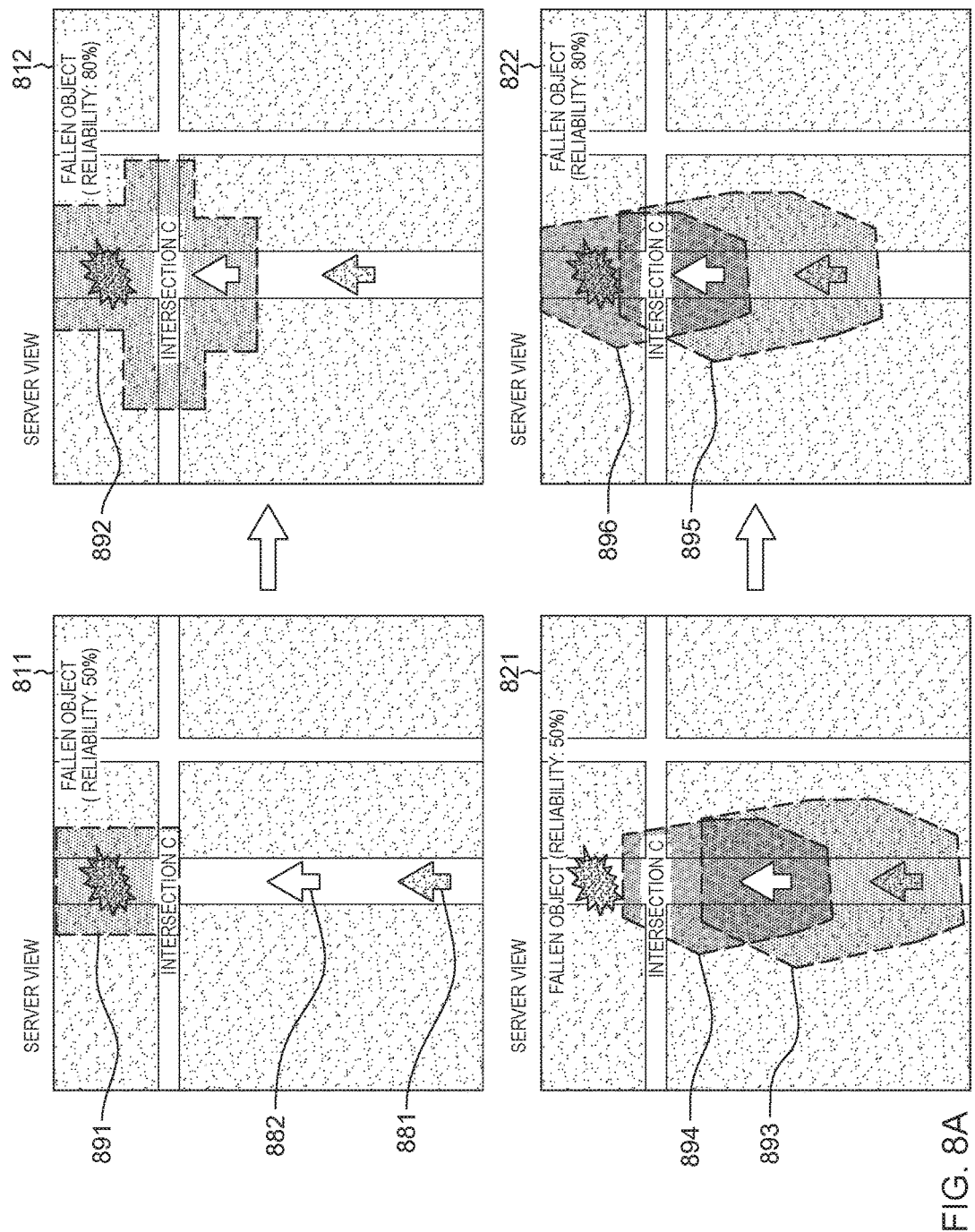
FIG. 8A is a diagram illustrating server views in which an event notification range and mobile body notification ranges are respectively displayed.
Figure 8B:
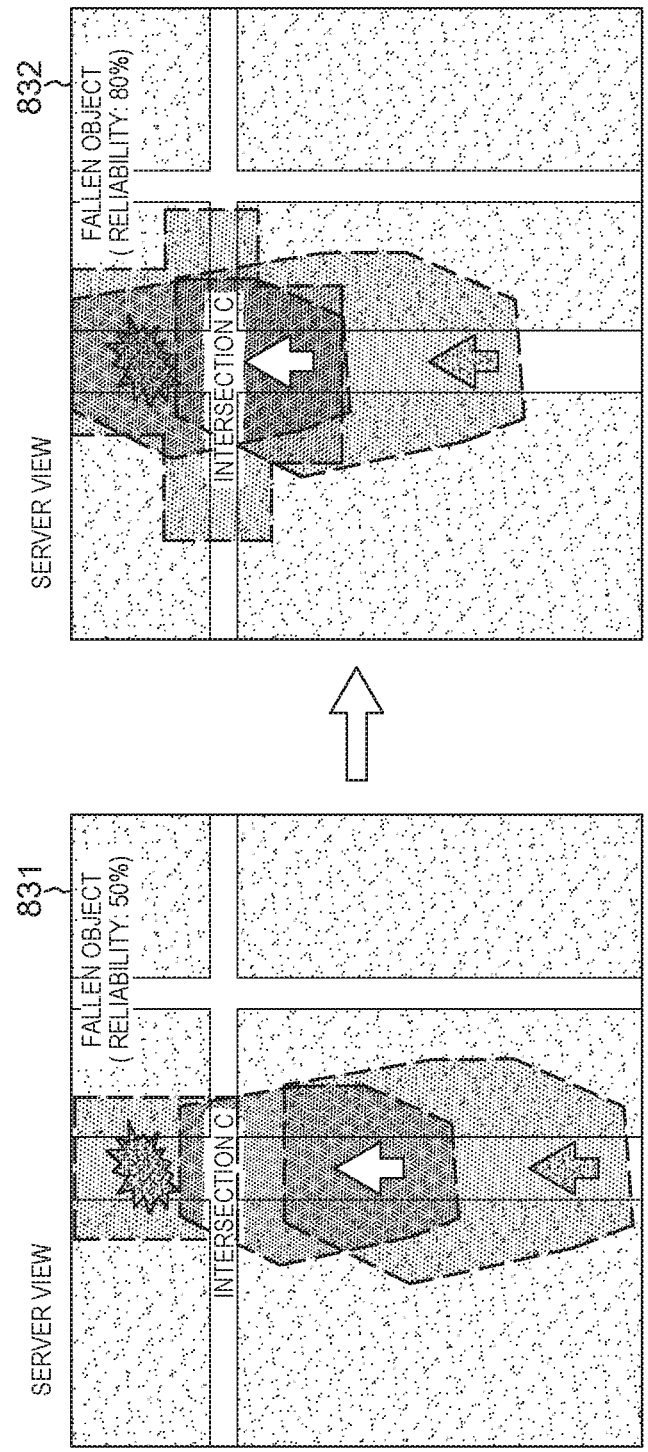
FIG. 8B is a diagram illustrating server views in which the event notification range in FIG. 8A and the mobile body notification ranges in FIG. 8A are displayed in a superimposed manner.
Figure 8C:
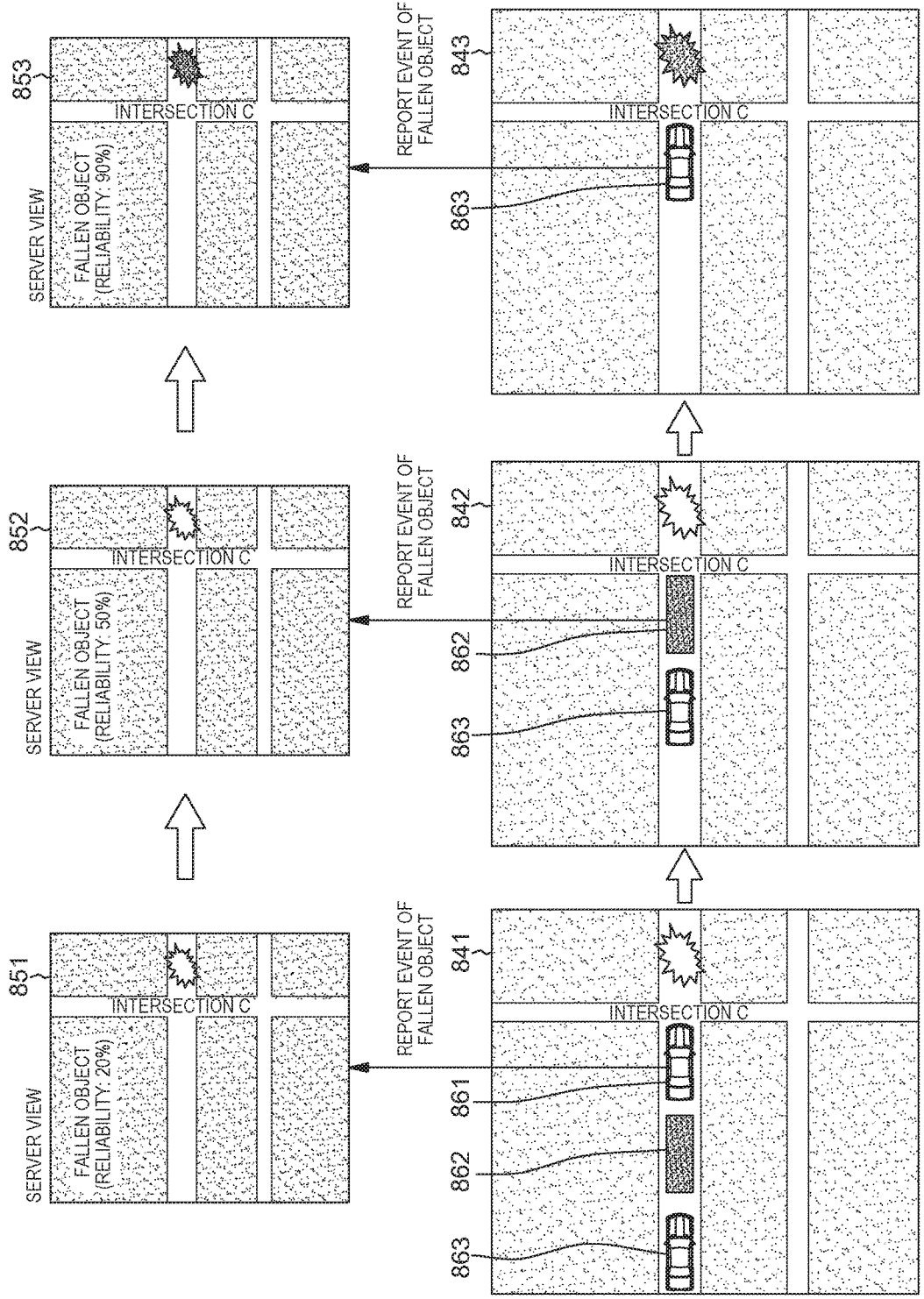
FIG. 8C is a diagram illustrating server views in which a reliability of an event changes over time.

FIGS. 8A to 8C illustrate the aspects illustrated in FIGS. 7A to 7B in which, as the reliability of the event of the fallen object increases over time, the encountering probability also increases.

FIG. 8A is a diagram illustrating server views in which an event notification range of the fallen object and a mobile body notification range of the mobile body are respectively displayed.

Server views (811 and 812) respectively display mobile bodies and an event notification range of the fallen object. In the aspects illustrated in FIGS. 8A to 8B, a mobile body A (such as a vehicle) (represented with an up arrow) (881) is a mobile body that is notified from the server computer (121) that it is approaching a particular area, and a mobile body B (such as a vehicle) (represented with an up arrow) (882) is a mobile body that has a communication device capable of sending image information and sensor information, wherein the communication device can send, in real time, the image information and the sensor information captured by an image capturing device to the server computer (121) or any other server computer that is collecting events. It is supposed that the mobile body A (881) runs the back of the mobile body B (882), and that the mobile body B (882) is approaching the intersection C earlier than the mobile body A (881).

The server view (811) displays an event notification range (891) of the fallen object as a polygon that is drawn with a dotted line and that has a translucent color (such as a translucent yellow, because the reliability is intermediate (50%)). Also, the server view (811) indicates that the mobile body A (881) runs the back of the mobile body B (882). Also, it is supposed that a sensor provided in the mobile body B (882) is moving so far from the intersection C that the sensor cannot recognize the fallen object yet.

The server view (812) is a view that is displayed after a certain amount of time has elapsed since the server view (811) is displayed, and displays an event notification range (892) of the fallen object as a polygon that is drawn with a dotted line and that has a translucent color (such as a translucent red, because the reliability is high (80%)).

The server view (812) also indicates that the reliability of the fallen object has increased from 50% to 80% after the elapse of the certain amount of time. One of the reasons of this increase is that the mobile body B (882) notifies the server computer (121) or any other server computer collecting events that the fallen object exists.

Also, in the server view (812), because the reliability of the fallen object has increased from 50% to 80% after the elapse of the certain amount of time, the event notification range (892) of the fallen object is displayed larger than the event notification range (891) of the fallen object. In other words, the event notification range (892) of the fallen object is changing so as to be larger in accordance with the reliability.

A server view (821) is a view generated at the same time with the server view (811) and displays each of a mobile body notification range (893) of the mobile body A (881) and a mobile body notification range (894) of the mobile body B (882) as a polygon that is drawn with a dotted line and that has a translucent color (such as translucent blue).

A server view (822) is a view generated at the same time with the server view (812) and displays each of a mobile body notification range (895) of the mobile body A (881) and a mobile body notification range (896) of the mobile body B (882) as a polygon that is drawn with a dotted line and that has a translucent color (such as translucent blue).

Also, the server view (822) indicates that the reliability of the fallen object has increased from 50% to 80% after the elapse of the certain amount of time.

FIG. 8B is a diagram illustrating server views (831 and 832) in which the event notification range in FIG. 8A and the mobile body notification range in FIG. 8A are displayed in a superimposed manner.

The server view (831) displays the event notification range (891) of the fallen object indicated in the server view (811) of FIG. 8A and the mobile body notification ranges (893 and 894) of the mobile bodies indicated in the server view (821) of FIG. 8A in a superimposed manner. In response to an instruction regarding a screen display from a server administrator, the server computer (121) may switch between the server view (811), the server view (821), and the server view (831), or may display at least two of these server views in an aligned manner on a screen.

The server view (832) displays the event notification range (892) of the fallen object indicated in the server view (812) illustrated in FIG. 8A and the mobile body notification ranges (895 and 896) of the mobile bodies indicated in the server view (822) illustrated in FIG. 8A in a superimposed manner. In response to an instruction regarding a screen display from a server administrator, the server computer (121) may switch between the server view (812), the server view (822), and the server view (832), or may display at least two of these server views in an aligned manner on a screen.

FIG. 8C is a diagram illustrating server views (851, 852, and 853) in which the reliability of the event changes over time.

The server views (851, 852, and 853) indicate that the reliability of the fallen object is increasing over time from 20% to 50% to 90%.

A driving diagram (841) of the mobile body indicates that a mobile body D (861), a mobile body E (862), and a mobile body F (863) are approaching the intersection C in this order. Each of the mobile body D (861), the mobile body E (862), and the mobile body F (863) is a mobile body that has a communication device capable of sending image information and sensor information, wherein the communication device can send, in real time, the image information and the sensor information to the server computer (121) or any other server computer that is collecting events.

As illustrated in the driving diagram (841), suppose that, when the mobile body D (861) passes through the intersection C, a sensor provided in the mobile body D (861) recognizes the fallen object on a road.

The mobile body D (861) then sends information indicating the existence of the fallen object to the server computer (121), for example. In response to the reception of the information, the server computer (121) calculates the reliability of the event of the fallen object. As a result, suppose that the server computer (121) calculates the reliability of the fallen object as 20%. The server computer (121) then displays the reliability (20%) of the fallen object on the server view (851).

Next, as illustrated in the driving diagram (842), suppose that, when the mobile body E (862) passes through the intersection C, an image capturing device provided in the mobile body E (862) captures an image in which the fallen object on the road is shown.

The mobile body E (862) is sequentially sending captured images to the server computer (121), for example. The server computer (121) receives the images, performs image analysis of the images, and detects that the fallen object exists. In response to the detection of the fallen object, the server computer (121) calculates the reliability of the event of the fallen object. As a result, suppose that the server computer (121) recalculates the reliability of the fallen object as 50% (852), on the basis of the increase in the frequency of reporting the same event. The server computer (121) then displays the reliability (50%) of the fallen object on the server view (852).

Next, as illustrated in the driving diagram (843), suppose that, when the mobile body F (863) passes through the intersection C, an image capturing device provided in the mobile body F (863) captures an image in which the fallen object on the road is shown.

The mobile body F (863) is sequentially sending captured images to the server computer (121), for example. The server computer (121) receives the images, performs image analysis of the images, and detects that the fallen object exists. In response to the detection of the fallen object, the server computer (121) calculates the reliability of the event of the fallen object. As a result, suppose that the server computer (121) recalculates the reliability of the fallen object as 90% (853), on the basis of the increase in the frequency of reporting the same event. The server computer (121) then displays the reliability (90%) of the fallen object on a server view (853).

As illustrated in FIG. 8C, the server computer (121) calculates the reliability of an event as a low value when the information source of the event is only one mobile body. As the same event is reported several times from different mobile bodies, however, the server computer (121) increases the reliability of the same event because the same event becomes more probable.

Figure 9:
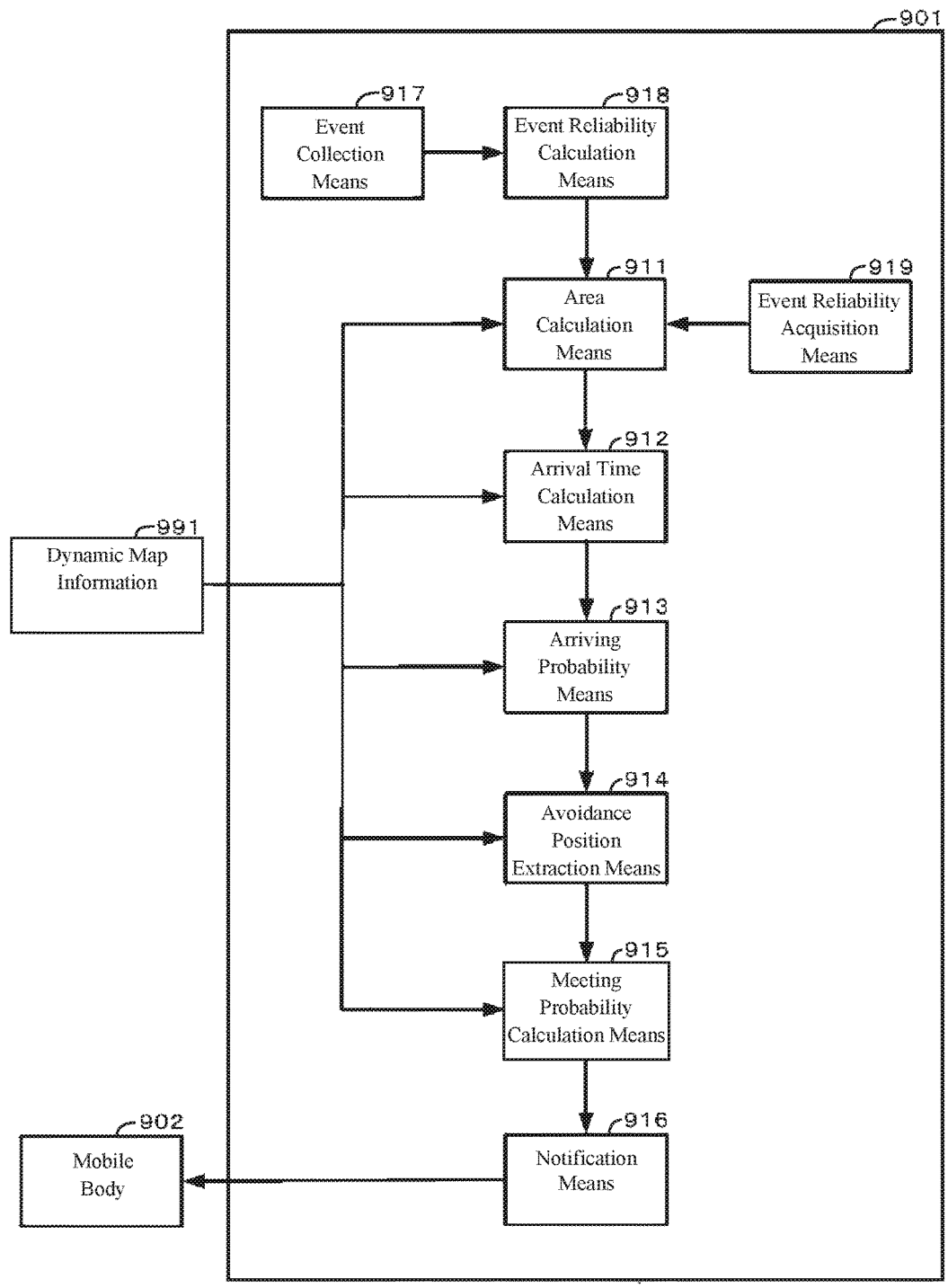
FIG. 9 is one example of a functional block diagram of a server computer that preferably has the hardware configuration illustrated in FIG. 1A or 1B and that notifies a mobile body that the mobile body is approaching a particular area in accordance with an embodiment of the present invention.

FIG. 9 is one example of a functional block diagram of a server computer that preferably has the hardware configuration illustrated in FIG. 1A or 1B and that notifies a mobile body (902) that the mobile body (902) is approaching a particular area in accordance with an embodiment of the present invention.

A server computer (901) may have a hardware configuration (101) illustrated in FIG. 1A or a hardware configuration (121) illustrated in FIG. 1B.

The server computer (901) includes area calculation means (911), estimated arrival time calculation means (912), arriving probability calculation means (913), avoidance position extraction means (914), encountering probability calculation means (915), and notification means (916).

Also, the server computer (901) may optionally include event collection means (917) and event reliability calculation means (918). Alternatively, the server computer (901) may include event reliability acquisition means (919) instead of the event collection means (917) and the event reliability calculation means (918).

The area calculation means (911) calculates a plurality of areas where the mobile body (902) may arrive on the basis of the dynamic map information (991).

Also, the area calculation means (911) may create an event notification range for notifying the mobile body (902) of an event. The area calculation means (911) may change the event notification range in accordance with the reliability of the event.

Also, the area calculation means (911) may create a mobile body notification range of the mobile body (902) by connecting reachable points of the mobile body (902).

Also, the area calculation means (911) may determine the closeness between the event notification range and the mobile body notification range for calculating a plurality of areas where the mobile body (902) may arrive.

Also, the area calculation means (911) may execute step 205 illustrated in FIG. 2A.

The estimated arrival time calculation means (912) calculates an estimated arrival time for arriving at a region affected by the event.

Also, the estimated arrival time calculation means (912) may execute the step of calculating an estimated arrival time, which is included in step 206 illustrated in FIG. 2A.

The arriving probability calculation means (913) calculates, for each event occurring in the plurality of areas calculated by the area calculation means (911), an arriving probability of arriving at a region affected by the event.

Also, the arriving probability calculation means (913) executes the step of calculating an arriving probability, which is included in step 206 illustrated in FIG. 2A.

The avoidance position extraction means (914) extracts an avoidance position for enabling the mobile body (902) to avoid arriving at a region affected by an event occurring in the plurality of areas calculated by the area calculation means (911).

Also, the avoidance position extraction means (914) may execute the process of step 207 illustrated in FIG. 2A.

The encountering probability calculation means (915) calculates, on the basis of a reliability of an event, the arriving probability calculated by the arriving probability calculation means (913), and the avoidance position extracted by the avoidance position extraction means (914), an encountering probability of meeting a region affected by the event.

Also, the encountering probability calculation means (915) may calculate the encountering probability on the basis of the estimated arrival time in addition to the reliability of the event, the arriving probability, and the avoidance position.

Also, the encountering probability calculation means (915) may recalculate the encountering probability in accordance with dynamic change of an overlapping region between the event notification range and the mobile body notification range.

Also, the encountering probability calculation means (915) may calculate the following: the encountering probability for each traveling direction of the mobile body (902); the encountering probability for each traveling lane of the mobile body (902); the encountering probability for each moving route of the mobile body (902); or the encountering probability on the basis of a driving history of the mobile body (902) or another mobile body.

The notification means (916) notifies the mobile body (902) of the encountering probability calculated by the encountering probability calculation means (915).

Also, the notification means (916) may further notifies the mobile body (902) of a type of the event corresponding to the encountering probability in addition to the encountering probability.

Also, the notification means (916) may further notify the mobile body (902) of a location of the event corresponding to the encountering probability in addition to the encountering probability.

Also, the notification means (916) may execute the process of step 209 illustrated in FIG. 2A.

The event collection means (917) collects events sent from information sources of events.

The event reliability calculation means (918) increments (by one, for example) the reliability of an event when the same event is collected.

The event reliability acquisition means (919) acquires a reliability of an event from another server computer calculating the reliability.

What is claimed is:

1. A method comprising:
calculating, by a server computer, a plurality of areas where a mobile body may arrive on a basis of dynamic map information;
calculating, by the server computer, for an event occurring in the plurality of areas, an estimated arrival time of the mobile body at a region affected by the event, wherein calculating the estimated arrival time comprises using the dynamic map information on a basis of a distance between the mobile body and the region affected by the event, a speed of the mobile body, flow volume on a road, a number of intersections that exist between a current position of the mobile body and the road, and travelling history information;
calculating, by the server computer, for the event occurring in the plurality of areas, an arriving probability of the mobile body arriving at the region affected by the event, wherein calculating the arriving probability comprises using the dynamic map information on a basis of a reliability of the event, connection of the road where the event is occurring, a number of roads where the mobile can choose to travel on at an intersection, the calculated estimated arrival time, and the travelling history information;
extracting, by the server computer, an avoidance position for enabling the mobile body to avoid arriving at the region affected by the event;
calculating, by the server computer, an encountering probability of the mobile body meeting the region affected by the event on a basis of the reliability of the event, the arriving probability, and the avoidance position, wherein the encountering probability is a percentage; and
notifying, by the server computer, the mobile body of the encountering probability, wherein the encountering probability is displayed on a display device associated with the mobile body and wherein the display device displays risk and avoidance information for each traveling direction of the mobile body.

2. The method of claim 1, wherein the reliability of the event is calculated on a basis of an information source of the event, a frequency of reporting the event, or a combination of the information source and the frequency.

3. The method of claim 2, wherein the reliability of the event is weighted according to the information source of the event.

4. The method of claim 2, wherein the reliability of the event is set so as to be calculated higher as the frequency of reporting the event becomes higher.

5. The method of claim 3, wherein the reliability of the event is set so as to be calculated higher when the information source of the event is a public or private institution than when the information source of the event is the mobile body.

6. The method of claim 1, further comprising:
collecting events; and
incrementing the reliability of the event when the event is collected.

7. The method of claim 1, wherein the event corresponds to any of sensor information, image or movie information from the mobile body, various kinds of sensor information, weather information, disaster information, traffic control information, traffic regulation information, traffic jam information, construction information, traffic accident information, road surface information, parking information, images, or movies from sensors, or special occasion information.

8. The method of claim 1, wherein calculating the plurality of areas comprises creating an event notification range for notifying the mobile body of the event.

9. The method of claim 8, wherein the event notification range changes in accordance with the reliability of the event.

10. The method of claim 8, wherein calculating the plurality of areas comprises connecting reachable points of the mobile body to create a mobile body notification range.

11. The method according to claim 10, wherein calculating the encountering probability occurs in accordance with dynamic change of an overlapping region between the event notification range and the mobile body notification range.

12. The method according to claim 1, wherein the encountering probability is calculated with respect to a driving history of the mobile body.

13. The method of claim 1, wherein calculating the arriving probability comprises calculating the estimated arrival.

14. The method of claim 13, wherein the encountering probability is calculated on the basis of the estimated arrival time in addition to the reliability of the event, the arriving probability, and the avoidance position.

15. The method according to claim 1, wherein notifying the mobile body of the encountering probability comprises further notifying the mobile body of a type of the event corresponding to the encountering probability.

16. A non-transitory computer program product comprising
one or more computer readable storage media and program instructions stored on the one or more computer readable storage media, the program instructions comprising instructions to:
calculate, by a server computer, a plurality of areas where a mobile body may arrive on a basis of dynamic map information;
calculate, by the server computer, for an event occurring in the plurality of areas, an estimated arrival time of the mobile body at a region affected by the event, wherein calculating the estimated arrival time comprises using the dynamic map information on a basis of a distance between the mobile body and the region affected by the event, a speed of the mobile body, flow volume on a road, a number of intersections that exist between a current position of the mobile body and the road, and travelling history information;
calculate, by the server computer, for the event occurring in the plurality of areas, an arriving probability of the mobile body arriving at the region affected by the event, wherein calculating the arriving probability comprises using the dynamic map information on a basis of a reliability of the event, connection of the road where the event is occurring, a number of roads where the mobile body can choose to travel on at an intersection, the calculated estimated arrival time, and the travelling history information;
extract, by the server computer, an avoidance position for enabling the mobile body to avoid arriving at the region affected by the event;

calculate, by the server computer, an encountering probability of the mobile body meeting the region affected by the event on a basis of the reliability of the event, the arriving probability, and the avoidance position, wherein the encountering probability is a percentage; and notify, by the server computer, the mobile body of the encountering probability, wherein the encountering probability is displayed on a display device associated with the mobile body and wherein the display device displays risk and avoidance information for each traveling direction of the mobile body.

17. A computer system comprising:

one or more computer processors;

one or more computer-readable storage media; and program instructions stored on the computer-readable storage media for execution by at least one of the one or more computer processors, the program instructions comprising instructions to calculate, by a server computer, a plurality of areas where a mobile body may arrive on a basis of dynamic map information, calculate, by the server computer, for an event occurring in the plurality of areas, an estimated arrival time of the mobile body at a region affected by the event, wherein calculating the estimated arrival time comprises using the dynamic map information on a basis of a distance between the mobile body and the region affected by the event, a speed of the mobile body, flow volume on a road, a number of intersections that exist between a current position of the mobile body and the road, and travelling history information, calculate, by the server computer, for the event occurring in the plurality of areas, an arriving probability of the mobile body arriving at the region affected by the event, wherein calculating the arriving probability comprises using the dynamic map information on a basis of a reliability of the event, connection of the road where the event is occurring, a number of roads where the mobile can choose to travel on at an intersection, the calculated estimated arrival time, and the travelling history information, extract, by the server computer, an avoidance position for enabling the mobile body to avoid arriving at the region affected by the event, calculate, by the server computer, an encountering probability of the mobile body meeting region affected by the event on a basis of the reliability of the event, the arriving probability, and the avoidance position, wherein the encountering probability is a percentage, and notify, by the server computer, the mobile body of the encountering probability, wherein the encountering probability is displayed on a display device associated with the mobile body and wherein the display device displays risk and avoidance information for each traveling direction of the mobile body.

* * * * *